(12) United States Patent
Lundby et al.

(10) Patent No.: US 6,625,197 B1
(45) Date of Patent: Sep. 23, 2003

(54) METHOD AND APPARATUS FOR MULTIPATH DEMODULATION IN A CODE DIVISION MULTIPLE ACCESS COMMUNICATION SYSTEM

(75) Inventors: Stein Lundby, San Diego, CA (US); Leonid Razoumov, San Diego, CA (US); Charles E. Wheatley, III, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/182,367

(22) Filed: Oct. 27, 1998

(51) Int. Cl.$^7$ .................................................. H04B 1/69
(52) U.S. Cl. ...................... 375/130; 375/136; 375/147; 370/208; 370/342
(58) Field of Search ................. 375/130, 140, 375/145, 147, 150, 136, 142, 143, 144, 148, 152, 343; 370/203, 208, 209, 320, 335, 342, 441, 479

(56) References Cited

U.S. PATENT DOCUMENTS

| | | | |
|---|---|---|---|
| 4,112,257 A | 9/1978 | Frost | 455/555 |
| 4,222,115 A | 9/1980 | Cooper et al. | 375/130 |
| 4,669,091 A | 5/1987 | Nossen | 375/232 |
| 4,672,658 A | 6/1987 | Kavehrad et al. | 455/555 |
| 4,694,467 A | 9/1987 | Mui | 375/144 |
| 4,736,460 A | 4/1988 | Rilling | 455/283 |
| 4,752,969 A | 6/1988 | Rilling | 455/278.1 |
| 4,765,753 A | 8/1988 | Schmidt | 370/332 |
| 4,797,950 A | 1/1989 | Rilling | 455/276.1 |
| 5,109,390 A | 4/1992 | Gilhousen et al. | 375/150 |
| 5,422,909 A * | 6/1995 | Love et al. | 375/147 |
| 5,550,811 A * | 8/1996 | Kaku et al. | 370/342 |
| 5,648,983 A | 7/1997 | Kostic et al. | 375/152 |
| 5,930,230 A * | 7/1999 | Odenwalder et al. | 370/208 |
| 6,101,168 A * | 8/2000 | Chen et al. | 370/228 |

FOREIGN PATENT DOCUMENTS

| | | |
|---|---|---|
| EP | 0749215 | 12/1996 |
| GB | 2331901 | 6/1999 |
| WO | 9967906 | 12/1999 |

OTHER PUBLICATIONS

*Digital Communications,* Third Edition, by Proakis, McGraw Hill, Inc., Chapter 14, pp. 797–806.

* cited by examiner

*Primary Examiner*—Shuwang Liu
(74) *Attorney, Agent, or Firm*—Philip Wadsworth; Kent Baker; Sean English

(57) ABSTRACT

Multipath RAKE receiver structure that allows for the concurrent demodulation of multipath signals that arrive at the receiver at arbitrarily low arrival time differences. The fingers are set to be a fixed offset from one another. One finger tracks the shift in the peak of the multipath component and the additional fixed offset fingers follow the tracking.

12 Claims, 13 Drawing Sheets

METHOD AND APPARATUS FOR MULTIPATH DEMODULATION IN A CODE DIVISION MULTIPLE ACCESS COMMUNICATION SYSTEM

BACKGROUND OF THE INVENTION

I. Field of the Invention

The present invention relates to communications. More particularly, the present invention relates to a novel and improved method and apparatus for demodulating code division multiple access (CDMA) signals.

II. Description of the Related Art

In a wireless radiotelephone communication system, many users communicate over a wireless channel to connect to wireline telephone systems. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein.

In the '307 patent, a multiple access technique is disclosed where a large number of mobile telephone system users, each having a transceiver, communicate through satellite repeaters or terrestrial base stations using CDMA spread spectrum communication signals. The base station-to-mobile station signal transmission path is referred to as the forward link and the mobile station-to-base station signal transmission path is referred to as the reverse link.

In using CDMA communications, the frequency spectrum can be reused multiple times thus permitting an increase in system user capacity. Each base station provides coverage to a limited geographic area and links the mobile stations in its coverage area through a cellular system switch to the public switched telephone network (PSTN). When a mobile station moves to the coverage area of a new base station, the routing of that user's call is transferred to the new base station.

The CDMA modulation techniques discussed in the '307 patent and in U.S. Pat. No. 5,102,459 entitled "SYSTEM AND METHOD FOR GENERATING SIGNAL WAVEFORMS IN A CDMA CELLULAR TELEPHONE SYSTEM", assigned to the assignee of the present invention and incorporated by reference herein, mitigate the special problems of the terrestrial channel, such as multipath and fading. Instead of being an impediment to system performance, as it is with narrowband systems, separable multipaths can be diversity combined in a mobile rake receiver for enhanced modem performance. The use of a RAKE receiver for improved reception of CDMA signals is disclosed in U.S. Pat. No. 5,109,390, entitled "DIVERSITY RECEIVER IN A CDMA CELLULAR TELEPHONE SYSTEM", assigned to the assignee of the present invention and incorporated by reference herein. In the mobile radio channel, multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath properties of the terrestrial channel produce, at the receiver, signals having traveled several distinct propagation paths. One characteristic of a multipath channel is the time spread introduced in a signal that is transmitted through the channel. As described in the '390 patent, the spread spectrum pseudonoise (PN) modulation used in a CDMA system allows different propagation paths of the same signal to be distinguished and combined, provided the difference in path delays exceeds the PN chip duration. If a PN chip rate of approximately 1 MHz is used in a CDMA system, the full spread spectrum processing gain, equal to the ratio of the spread bandwidth to the system data rate, can be employed against paths having delays that differ by more than one microsecond. A one microsecond path delay differential corresponds to a differential path distance of approximately 300 meters.

Another characteristic of the multipath channel is that each path through the channel may cause a different attenuation factor. For example, if an ideal impulse is transmitted over a multipath channel, each pulse of the received stream of pulses generally has a different signal strength than other received pulses.

Yet another characteristic of the multipath channel is that each path through the channel may cause a different phase on the signal. If, for example, an ideal impulse is transmitted over a multipath channel, each pulse of the received stream of pulses generally has a different phase than other received pulses. This can result in signal fading.

A fade occurs when multipath vectors are added destructively, yielding a received signal that is smaller than either individual vector. For example, if a sine wave is transmitted through a multipath channel having two paths where the first path has an attenuation factor of X dB, a time delay of d with a phase shift of Q radians, and the second path has an attenuation factor of X dB, a time delay of d with a phase shift of Q+π radians, no signal would be received at the output of the channel.

As described above, in current CDMA demodulator structures, the PN chip interval defines the minimum separation two paths must have in order to be combined. Before the distinct paths can be demodulated, the relative arrival times (or offsets) of the paths in the received signal must first be determined. The demodulator performs this function by "searching" through a sequence of offsets and measuring the energy received at each offset. If the energy associated with a potential offset exceeds a certain threshold, a demodulation element, or "finger" may be assigned to that offset. The signal present at that path offset can then be summed with the contributions of other fingers at their respective offsets.

A method and apparatus of finger assignment based on searcher and finger energy levels is disclosed in U.S. Pat. No. 5,490,165, entitled "FINGER ASSIGNMENT IN A SYSTEM CAPABLE OF RECEIVING MULTIPLE SIGNALS", assigned to the assignee of the present invention and incorporated by reference herein. In the exemplary embodiment, the CDMA signals are transmitted in accordance with the Telecommunications Industry Association TIA/EIA/IS-95-A, entitled "MOBILE STATION-BASE STATION COMPATIBILITY STANDARD FOR DUAL-MODE WIDEBAND SPREAD SPECTRUM CELLULAR SYSTEM". An exemplary embodiment of the circuitry capable of demodulating IS-95 forward link signals is described in detail in U.S. Pat. No. 5,764,592, entitled "MOBILE DEMODULATOR ARCHITECTURE FOR A SPREAD SPECTRUM MULTIPLE ACCESS SYSTEM", assigned to the assignee of the present invention and incorporated by reference herein. An exemplary embodiment of the circuitry capable of demodulating IS-95 reverse link signals is described in detail in U.S. Pat. No. 5,654,979, entitled "CELL SITE DEMODULATOR ARCHITECTURE FOR A SPREAD SPECTRUM MULTIPLE ACCESS COMMUNICATION SYSTEM," assigned to the assignee of the present invention and incorporated by reference herein.

FIG. 1 shows an exemplary set of signals from a base station arriving at the mobile station. It will be understood by one skilled in the art that FIG. 1 is equally applicable to the signals from a mobile station arriving at the base station. The vertical axis represents the power received on a decibel (dB) scale. The horizontal axis represents the delay in the arrival time of a signal due to multipath delays. The axis (not shown) going into the page represents a segment of time. The signals in the common plane traveled along different paths arriving at the receiver at the same time, but having been transmitted at different times.

In a common plane, peaks to the right were transmitted at an earlier time by the base station than peaks to the left. For example, the left-most peak spike 2 corresponds to the most recently transmitted signal. Each signal spike 2–7 has traveled a different path and therefore exhibits a different time delay and a different amplitude response.

The six different signal spikes represented by spikes 2–7 are representative of a severe multipath environment. Typical urban environments produce fewer usable paths. The noise floor of the system is represented by the peaks and dips having lower energy levels.

The task of the searcher is to identify the delay as measured by the horizontal axis of signal spikes 2–7 for potential finger assignment. The task of the finger is to demodulate one of a set of the multipath peaks for combination into a single output. It is also the task of a finger, once assigned to a multipath peak, to track that peak as it may move in time.

The horizontal axis can also be thought of as having units of PN offset. At any given time, the mobile station receives a variety of signals from a base station, each of which has traveled a different path and may have a different delay than the others. The base station's signal is modulated by a PN sequence. A local copy of the PN sequence is also generated at the mobile station. Also at the mobile station, each multipath signal is individually demodulated with a PN sequence code aligned to its received time offset. The horizontal axis coordinates can be thought of as corresponding to the PN sequence code offset that would be used to demodulate a signal at that coordinate.

Note that each of the multipath peaks varies in amplitude as a function of time, as shown by the uneven ridge of each multipath peak. In the limited time shown, there are no major changes in the multipath peaks. Over a more extended time range, multipath peaks disappear and new paths are created as time progresses. The peaks can also slide to earlier or later offsets as the path distances change when the mobile station moves relative to the base station. Each finger tracks these small variations in the signal assigned to it.

In narrowband systems, the existence of multipath in the radio channel can result in severe fading across the narrow frequency band being used. Such systems are capacity constrained by the extra transmit power needed to overcome a deep fade. As noted above, CDMA signal paths may be discriminated and diversity combined in the demodulation process.

Three major types of diversity exist: time diversity, frequency diversity, and space/path diversity. Time diversity can best be obtained by the use of repetition, time interleaving, and error correction and detection coding that introduce redundancy. A system may employ each of these techniques as a form of time diversity.

CDMA, by its inherent wideband nature, offers a form of frequency diversity by spreading the signal energy over a wide bandwidth. The frequency selective fading that can cause a deep fade across a narrowband system's frequency bandwidth usually only affects a fraction of the frequency band employed by the CDMA spread spectrum signal.

The rake receiver provides path diversity through its ability to combine multipath delayed signals; all paths that have a finger assigned to them must fade together before the combined signal is degraded. Additional path diversity is obtained through a process known as "soft hand-off" in which multiple simultaneous, redundant links from two or more base stations can be established with the mobile station. This supports a robust link in the challenging environment at the cell boundary region. Examples of path diversity are illustrated in U.S. Pat. No. 5,101,501 entitled "SOFT HAND-OFF IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

Both the cross-correlation between different PN sequences and the autocorrelation of a PN sequence, for all time shifts other than zero, have a nearly zero average value. This allows the different signals to be discriminated upon reception. Autocorrelation and cross-correlation require that logical "0" take on a value of "1" and logical "1" take on a value of "–1", or a similar mapping, in order that a zero average value be obtained.

However, such PN signals are not orthogonal. Although the cross-correlation essentially averages to zero over the entire sequence length for a short time interval, such as an information bit time, the cross-correlation is a random variable with a binomial distribution. As such, the signals interfere with each other in much the same manner as if they were wide bandwidth Gaussian noise at the same power spectral density.

It is well known in the art that a set of n orthogonal binary sequences, each of length n, for n any power of 2 can be constructed (see *Digital Communications with Space Applications*, S. W. Golomb et al., Prentice-Hall, Inc., 1964, pp. 45–64). In fact, orthogonal binary sequence sets are also known for most lengths that are multiples of four and less than two hundred. One class of such sequences that is easy to generate is called the Walsh function; a Walsh function of order n can be defined recursively as follows:

$$W(n) = \begin{vmatrix} W\left(\frac{n}{2}\right) & W\left(\frac{n}{2}\right) \\ W\left(\frac{n}{2}\right) & W'\left(\frac{n}{2}\right) \end{vmatrix} \quad (1)$$

where W' denotes the logical complement of W, and W(0)= |0|.

A Walsh sequence or code is one of the rows of a Walsh function matrix. A Walsh function matrix of order n contains n sequences, each of length n Walsh chips. A Walsh function matrix of order n (as well as other orthogonal functions of length n) has the property that over the interval of n bits, the cross-correlation between all the different sequences within the set is zero. Every sequence in the set differs from every other sequence in exactly half of its bits. It should also be noted that there is always one sequence containing all zeroes and that all the other sequences contain half ones and half zeroes.

In the system described in the '459 patent, the call signal begins as a 9600 bit per second information source which is then converted by a rate 1/2 forward error correction encoder to a 19,200 symbols per second output stream. Each call signal broadcast from a cell is covered with one of sixty-four orthogonal Walsh sequences, each sixty-four Walsh chips, or one symbol, in duration. Regardless of the symbol being covered, the orthogonality of all Walsh sequences ensures that all interference from other user signals in that cell are canceled out during symbol integration. The non-orthogonal interference from other cells limits capacity on the forward link.

Each base station in a CDMA system transmits in the same frequency band using the same PN sequence, but with a unique offset relative to an unshifted PN sequence aligned to a universal time reference. The PN spreading rate is the same as the Walsh cover rate, 1.2288 MHz, or 64 PN chips per symbol. In the preferred embodiment, each base station transmits a pilot reference. In the description of the present invention different information is transmitted on the I and Q channels which increases the capacity of the system.

The pilot channel is a "beacon" transmitting a constant zero symbol and spread with the same I and Q PN sequences used by the traffic bearing signals. In the exemplary embodiment, the pilot channel is covered with the all zero Walsh sequence 0. During initial system acquisition the mobile searches all possible shifts of the PN sequence and once it has found a base station's pilot, it can then synchronize itself to system time. As detailed below, the pilot plays a fundamental role in the mobile demodulator rake receiver architecture well beyond its use in initial synchronization.

FIG. 2 depicts a generic rake receiver demodulator 10 for receiving and demodulating the forward link signal 20 arriving at the antenna 18. The analog transmitter and receiver 16 contain a QPSK downconverter chain that outputs digitized I and Q channel samples 32 at baseband. The sampling clock, CHIPX8 40, used to digitize the receive waveform, is derived from a voltage controlled temperature compensated local oscillator (TCXO).

The demodulator 10 is supervised by a microprocessor 30 through the databus 34. Within the demodulator, the I and Q samples 32 are provided to a plurality of fingers 12$a$–$c$ and a searcher 14. The searcher 14 searches out windows of offsets likely to contain multipath signal peaks suitable for assignment of fingers 12$a$–$c$. For each offset in the search window, the searcher 14 reports the pilot energy it found at that offset to the microprocessor. The fingers 12$a$–$c$ are then surveyed, and those unassigned or tracking weaker paths are assigned by the microprocessor 30 to offsets containing stronger paths identified by searcher 14.

Once a finger 12$a$–$c$ has locked onto the multipath signal at its assigned offset it then tracks that path on its own until the path fades away or until it is reassigned using its internal time tracking loop. This finger time tracking loop measures energy on either side of the peak at the offset at which the finger is currently demodulating. The difference between these energies forms a metric which is then filtered and integrated.

The output of the integrator controls a decimator that selects one of the input samples over a chip interval to use in demodulation. If a peak moves, the finger adjusts its decimator position to move with it. The decimated sample stream is then despread with the PN sequence consistent with the offset to which the finger is assigned. The despread I and Q samples are summed over a symbol to produce a pilot vector ($P_I$, $P_Q$). These same despread I and Q samples are Walsh uncovered using the Walsh code assignment unique to the mobile user and the uncovered, despread I and Q samples are summed over a symbol to produce a symbol data vector ($D_I$, $D_Q$). The dot product operator is defined as $$P(n) \cdot D(n) = P_I(n)D_I(n) + P_Q(n)D_Q(n), \quad (2)$$

where $P_I(n)$ and $P_Q(n)$ are respectively the I and Q components of the pilot vector P for symbol n and $D_I(n)$ and $D_Q(n)$ are respectively the I and Q components of the data vector D for symbol n.

Since the pilot signal vector is much stronger than the data signal vector it can be used as an accurate phase reference for coherent demodulation; the dot product computes the magnitude of the data vector component in phase with the pilot vector. As described in U.S. Pat. No. 5,506,865, entitled "PILOT CARRIER DOT PRODUCT CIRCUIT" and assigned to the assignee of the present invention and incorporated by reference herein, the dot product weights the finger contributions for efficient combining, in effect scaling each finger symbol output 42$a$–$c$ by the relative strength of the pilot being received by that finger. Thus the dot product performs the dual role of both phase projection and finger symbol weighting needed in a coherent rake receiver demodulator.

Each finger has a lock detector circuit that masks the symbol output to the combiner 42 if its long term average energy does not exceed a minimum threshold. This ensures that only fingers tracking a reliable path will contribute to the combined output, thus enhancing demodulator performance.

Due to the relative difference in arrival times of the paths to which each finger 12$a$–$c$ is assigned, each finger 12$a$–$c$ has a deskew buffer that aligns the finger symbol streams 42$a$–$c$ so that the symbol combiner 22 can sum them together to produce a "soft decision" demodulated symbol. This symbol is weighted by the confidence that it correctly identifies the originally transmitted symbol. The symbols are sent to a deinterleaver/decoder circuit 28 that first frame deinterleaves and then forward error correction decodes the symbol stream using the maximum likelihood Viterbi algorithm. The decoded data is then made available to the microprocessor 30 or to other components, such as a speech vocoder, for further processing.

To demodulate correctly, a mechanism is needed to align the local oscillator frequency with the clock used at the cell to modulate the data. Each finger makes an estimate of the frequency error by measuring the rotation rate of the pilot vector in QPSK I, Q space using the cross product vector operator:

$$P(n) \times P(n-1) = P_I(n)P_Q(n-1) - P_I(n-1)P_Q(n) \quad (3)$$

The frequency error estimates from each finger 44$a$–$c$ are combined and integrated in frequency error combiner 26. The integrator output, LO_ADJ 36, is then fed to the voltage control of the TCXO in the analog transmitter and receiver 16 to adjust the clock frequency of the CHIPX8 clock 40, thus providing a closed loop mechanism for compensating for the frequency error of the local oscillator.

As described above, in current demodulator structures, a path must differ by at least one PN chip to have a separate finger allocated to its demodulation. However, there are cases when paths differ by less than a PN chip interval in the time, this situation leads to the existence of a "fat path". Under traditional demodulator implementations, only one finger could be allocated to demodulate the fat path. One of the reasons for this is that once assigned to a path, the finger tracks the path movement independently. Without central coordination of the fingers multiple fingers will converge to the same peak of the fat path. In addition, the searcher tends to get confused when paths are tracked which are to close to one another On an orthogonal forward link, there is a great deal of energy in each of the paths because all of the energy from the base station to all mobiles is transmitted using the same PN offset which are channelized by use of orthogonal code sequences. Moreover, orthogonal code sequences have poor autocorrelation in that the correlation between orthogonal code sequences is high. Thus, when paths on the forward link differ by less than a PN chip interval, the signals cannot be distinguished from one another by the outer PN spreading nor is the coding gain of the orthogonal spreading realized because of the time shift. The energy of the close multipath components in this case serves as noise and substantially degrades the performance of the demodulator assigned to the fat path. On the reverse link, close multipath components can also cause degradation of the demodulator assigned to the fat path.

The present invention is described with respect to the improvement of the demodulation of the forward link. However, the present invention is equally applicable to improving the demodulation of the reverse link.

SUMMARY OF THE INVENTION

The present invention is a novel and improved method and apparatus for multipath demodulation in a code division multiple access communication system. In current demodulator architectures, an accumulator is provided for each finger and the combining operation is performed subsequent to the accumulation operation. In the present invention, a demodulator structure is described that reduces the amount of hardware and software in the receiver by reducing the number of symbol accumulators to one.

Moreover, the present invention describes a demodulator structure that allows for the concurrent demodulation of multipath signals that arrive at the receiver at arbitrarily low arrival time differences. As described above, traditional demodulator structures prohibit the assignment of arbitrarily close fingers because the fingers converge to the peak of the path, negating any possible benefit sought from assigning the fingers to paths that are very close. In the present invention, the fingers are set to be a fixed offset from one another. In the present invention, one finger tracks the shift in the peak of the multipath component and the additional fixed offset fingers follow the tracking.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 3:
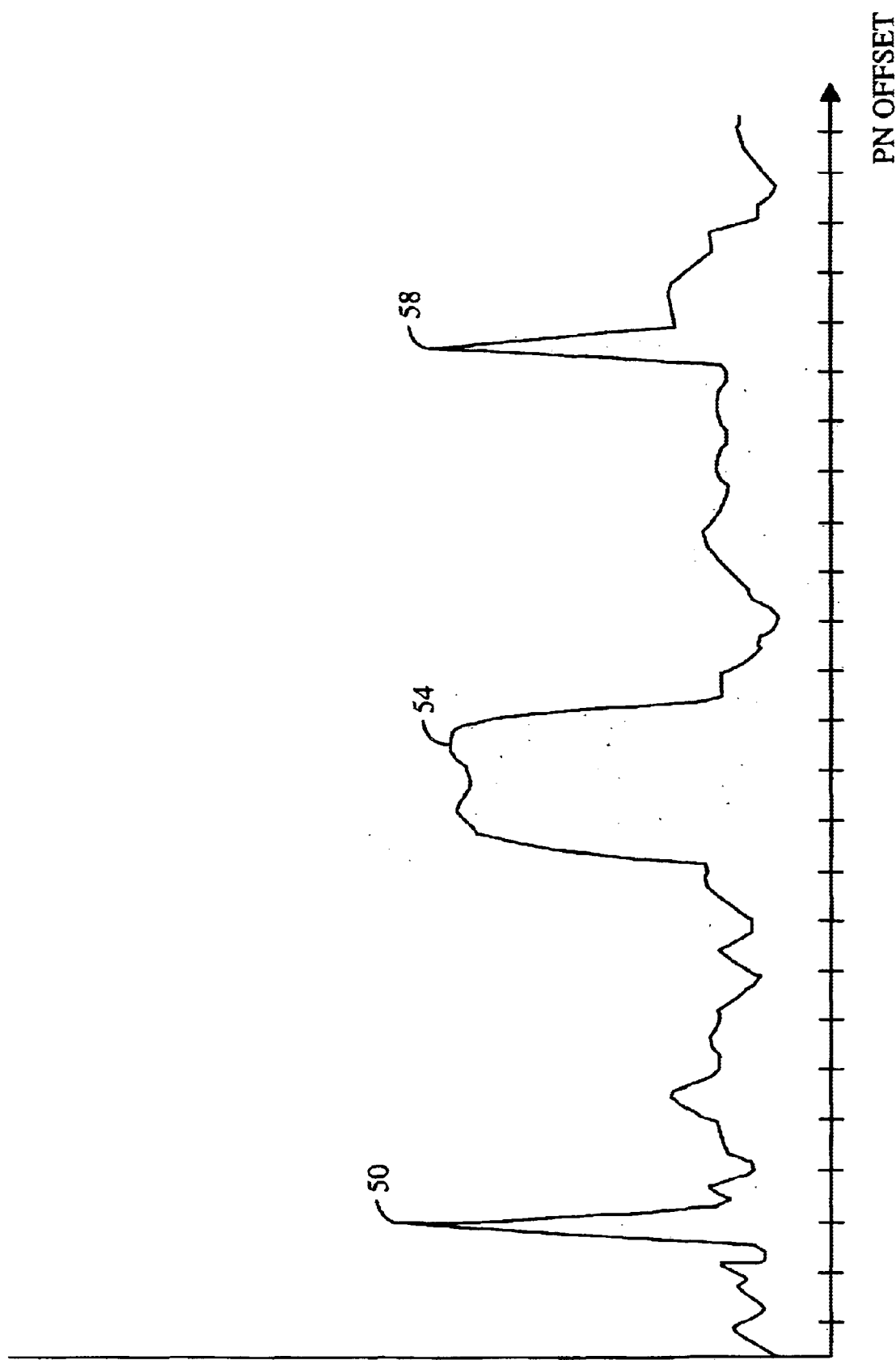
FIG. 3 is an illustration of a fat path situation in which a number of multipath components are very closely spaced with respect to one another in arrival times at the receiver.

FIG. 3 shows an exemplary set of signals from a base station arriving at the mobile station at a given time. It will be understood by one skilled in the art that FIG. 3 is equally applicable to the signals from a mobile station arriving at the base station. The vertical axis represents the power received on a decibel (dB) scale. The horizontal axis represents the delay in the arrival time of a signal due to multipath delays. The signals on the x-axis traveled along different paths arriving at the receiver at the same time, but having been transmitted at different times.

In a common plane, peaks to the right were transmitted at an earlier time by the base station than peaks to the left. For example, the left-most peak spike 50 corresponds to the most recently transmitted signal. Each signal spike 50, 54 and 58 has traveled a different path and therefore exhibits a different time delay and a different amplitude response.

The three different signal spikes represented by spikes 50, 54 and 58 are representative of a severe multipath environment. As described previously, the task of the searcher is to identify the delay as measured by the horizontal axis of signal spikes 50, 54 and 58 for potential finger assignment. However, in the present invention, the additional task of the searcher is to identify peak 54 as a fat path or set of multipath components to which the demodulator structure of the present invention is capable of effective demodulation of close multipath components. The task of each of the finger is to demodulate one of a set of the multipath peaks for combination into a single output. It is also the task of a finger, once assigned to a multipath peak, to track that peak as it may move in time.

Figure 4:
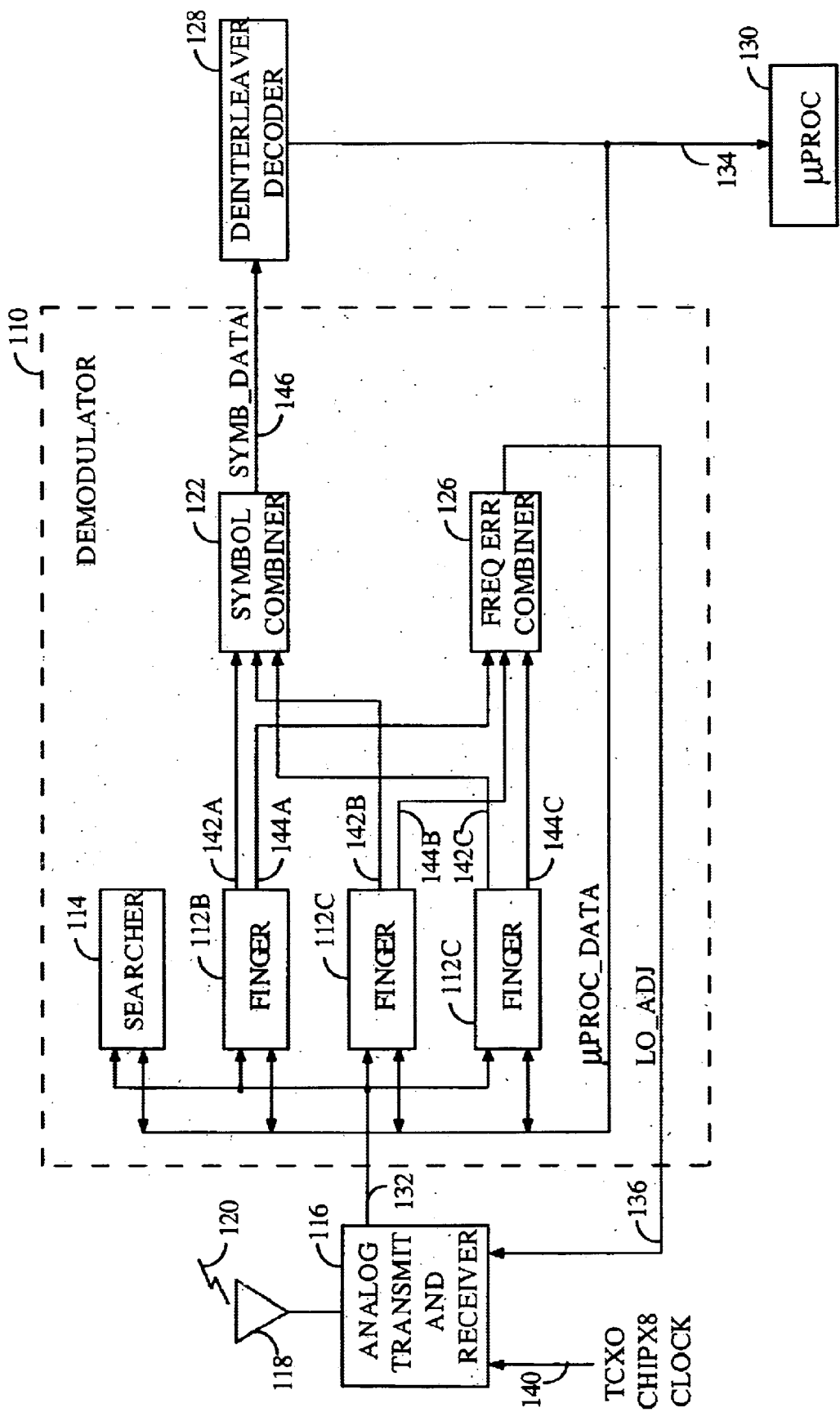
FIG. 4 is an illustration of the receiver structure that provides for effective demodulation of the closely spaced multipath components.

FIG. 4 depicts the rake receiver demodulator 110 of the present invention for receiving and demodulating the forward link signal 120 arriving at the antenna 118 of the present invention. The analog transmitter and receiver 116 contain a QPSK downconverter chain that outputs digitized I and Q channel samples 132 at baseband. In an exemplary embodiment, the sampling clock, CHIPX8 140, used to digitize the receive waveform, is derived from a voltage controlled temperature compensated local oscillator (TCXO).

The demodulator 110 is supervised by a microprocessor 130 through the databus 134. Within the demodulator, the I and Q samples 132 are provided to a plurality of fingers 112*a*–*c* and a searcher 114. Although the exemplary embodiment is described in terms of QPSK demodulation, the present invention is equally applicable to BPSK, QAM (Quadrature Amplitude Modulation), M-ary PSK or any known modulation method. The searcher 114 searches out windows of offsets likely to contain multipath signal peaks suitable for assignment of fingers 112*a*–*c*. For each offset in the search window, the searcher 114 reports the pilot energy it found at that window of offsets to the microprocessor 130. In the present invention, microprocessor 130 determines where to assign fingers and determines whether and where to assign a fat path demodulators.

Searcher 114 reports the energies in a window around peaks 50, 54 and 58. Microprocessor 130 determine from the reported energies that peaks 50 and 58 were narrow and could be successfully demodulated with a single path demodulator. Microprocessor 130 would also be able to identify the multipath component at peak 54 as a fat path and would assign for its demodulation the fat path demodulator of the present invention. So for example, fingers 112*a* and 112*b* demodulate single paths and are assigned to paths 50 and 58 of FIG. 3. Finger 112*c*, on the other hand, are directed by microprocessor 130 to perform a fat path demodulation and would be assigned to demodulate path 54.

Figure 5:
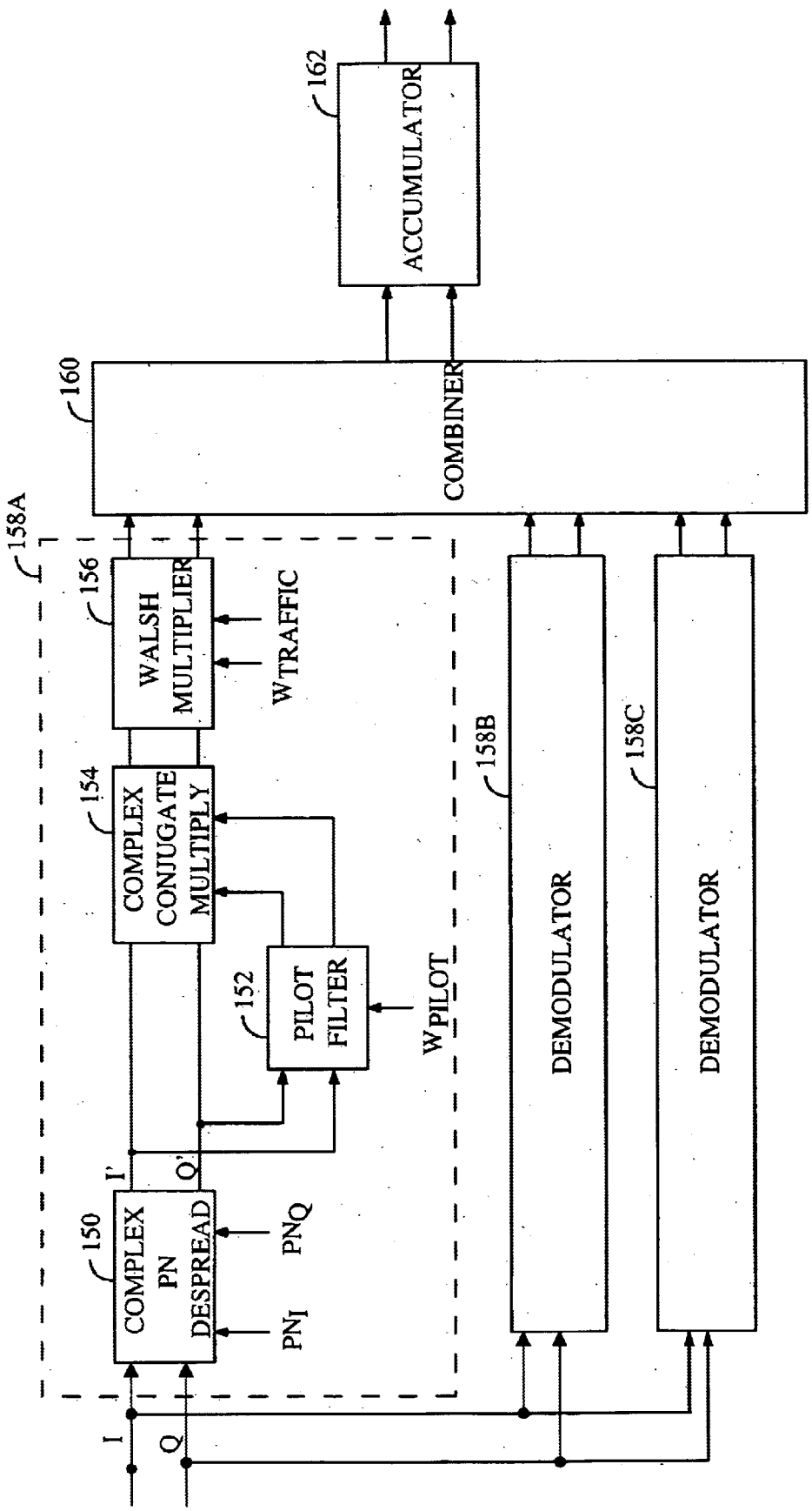
FIG. 5 is an illustration of an improved demodulation structure that allows for a single accumulator in the receiver architecture.

FIG. 5 illustrates a novel RAKE receiver structure that uses a single accumulator instead of an accumulator for.each finger as is provided in current RAKE receiver structures. The digitized samples are provided to complex PN despreader 150 of demodulator 158. In the exemplary embodiment, the signals are complex PN spread as described in U.S. patent application Ser. No. 08/856,428, entitled "HIGH DATA RATE CDMA WIRELESS COMMUNICATION SYSTEM USING VARIABLE SIZED CHANNEL CODES," filed May 14, 1997, assigned to the assignee of the present invention and incorporated by reference herein, in accordance with the following equations:

$$I = I'PN_I + Q'PN_Q \quad (4)$$

$$Q = I'PN_Q - Q'PN_I. \quad (5)$$

where $PN_I$ and $PN_Q$ are distinct PN spreading codes and I' and Q' are two channels being spread at the transmitter. Complex PN despreader 150 removes the complex spreading based on the PN codes, $PN_I$ and $PN_Q$, to provide two complex PN despread signals.

The complex PN despread signals are provided to pilot filter 152 and complex conjugate multiplier 154. Pilot filter 152 uncovers the pilot signal in accordance with the orthogonal covering ($W_{pilot}$) and, in a preferred embodiment, provides some filtering to the resultant signal to remove the effects of noise on the received signal. In the exemplary embodiment, the pilot signal is covered using Walsh 0 which is the all zeroes Walsh sequence. Thus, uncovering the Walsh sequence is a no op and pilot filter 152 simply acts as a low pass filter to reduce the effect of channel noise.

Complex conjugate multiplier 154 multiplies the signal from complex PN despreader 150 by the conjugate of the filtered pilot signal from pilot filter 152. By multiplying the complex despread data by the conjugate of the signals from pilot filter 152, the demodulator removes any phase error from the received signal. In effect complex conjugate multiply circuit projects the received signal onto the pilot signal and outputs the magnitudes of the projections.

The signals from complex conjugate multiplier 154 are provided to Walsh multiplier 156. Walsh multiplier 156 multiply the I and Q traffic channels with the orthogonal traffic channel covering sequences $W_{traffic}$. The traffic channel data is then output to symbol combiner 160. Demodulators 158*b* and 158*c* demodulate the received signals for different multipath components using different PN offsets of $PN_I$ and $PN_Q$ and are deskewed prior to being provided to combiner 160. In the exemplary embodiment, only signals with energies exceeding a predetermined threshold are combined in combiner 160. The combined symbol energies are thereafter provided to accumulator 162 which accumulates the combined energy valves over Walsh sequence intervals to provided estimates of the I+Q values.

In an alternative embodiment, complex conjugate multiplier 154 and Walsh multiplier 156 can be interchanged without the need for altering any other functions. It will be understood by one skilled in the art that the simple rearrangements of elements are well known in the art and are within the scope of the present invention.

Before turning our attention to the implementation of the fat finger demodulator structure, let us briefly examine the process that allows combining of the received signals in a CDMA communication system. Referring back to FIG. 1, it was described earlier that the peaks on the common plane were transmitted at different times and followed different propagation paths so as to arrive at the receiver at a common time. As described above, the signal in peak 2 corresponds to the most recently transmitted signal. The signal in peak 3 was transmitted approximately 2 PN chip intervals in time later. In order to combine the information in peak 2 with the information in peak 3, the information from peak 2 must be delayed by two PN chip intervals before being combined with the information from peak 3 so that different version of the same information are combined.

Figure 6:
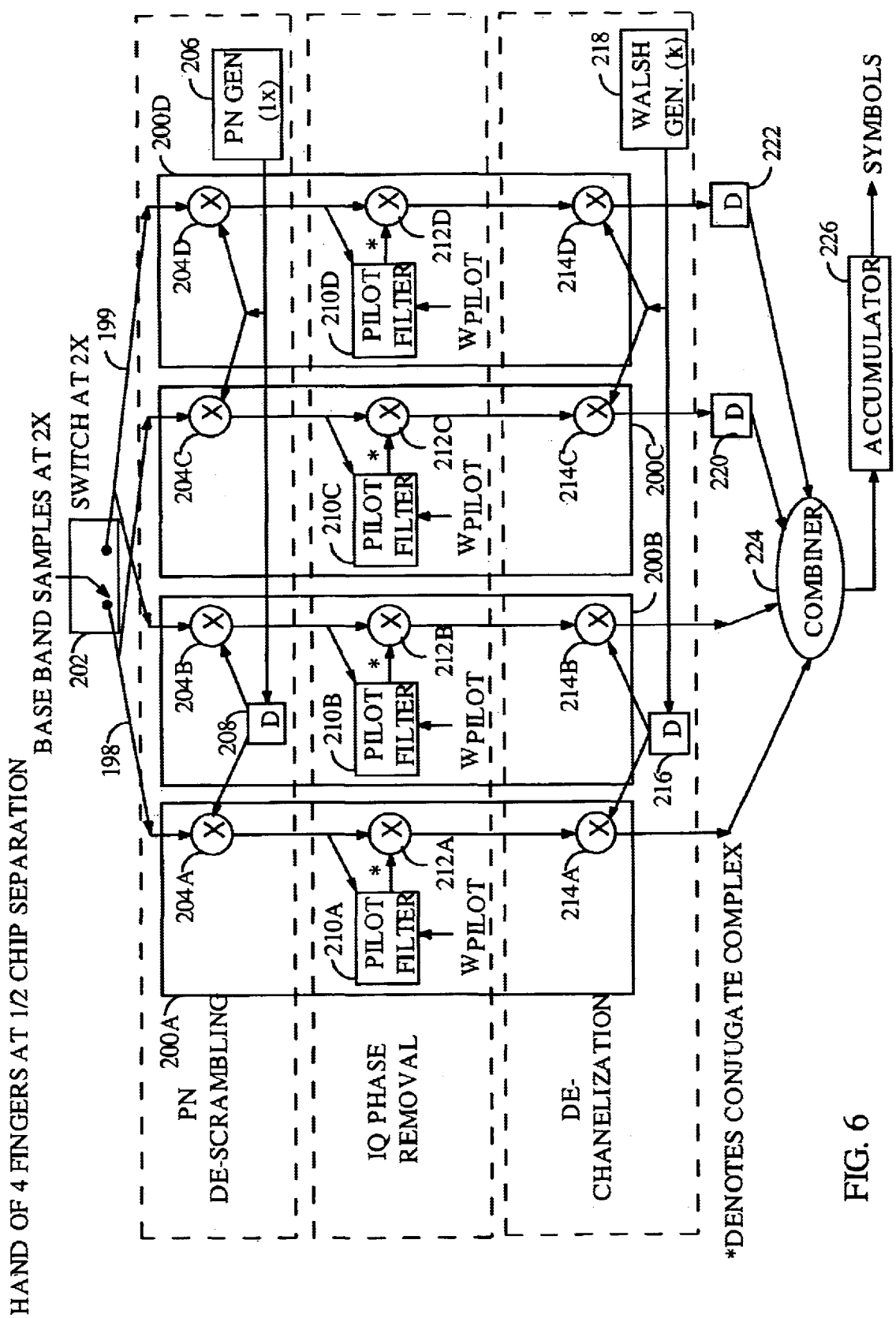
FIG. 6 is a first embodiment of the fat path demodulator of the present invention wherein four fingers are used to demodulate four multipath components with arrival times offset from one another by half of one PN chip wherein the method of path discrimination is through the offsetting of the PN sequences with accompanying deskewing prior to combination.

The proposed fat path demodulators take advantage of both PN shifting and time delay to provide for deskewing of the information. Turning to FIG. 6, a fat path demodulator is illustrated which performs demodulation of fat paths comprising a set of closely spaced multipath components with energy spread across a plurality of PN chips. In FIG. 6, four demodulators 200*a*–200*d* are provided to demodulate paths that are a fixed half PN chip distance from one another. The demodulators move together demodulating a PN offsets that are offset from one another by fixed increments. In an alternative embodiment, the microprocessor in the receiver could be used to determine the shape of the fat path and would adjust the values of delay elements in accordance with the shape of the path grouping. In the exemplary embodiment, one of the demodulators is the master and tracks the peak of set of multipath signals and the other demodulators act as slaves and follow the tracking of the master demodulator.

Demodulator 200a and demodulator 200c demodulate the received signal using PN sequences that are offset from one another by one PN chip interval. This can be seen by observing that the signal provided to input 198 is provided directly to demodulators 200a and 200c. Demodulator 200a demodulates the received signal in accordance with a PN offset from PN generator 206 that is delayed by one PN chip interval by delay element 208 and in accordance with a Walsh sequence from Walsh generator 218 that is delayed by one PN chip interval by delay element 216.

Figure 1:
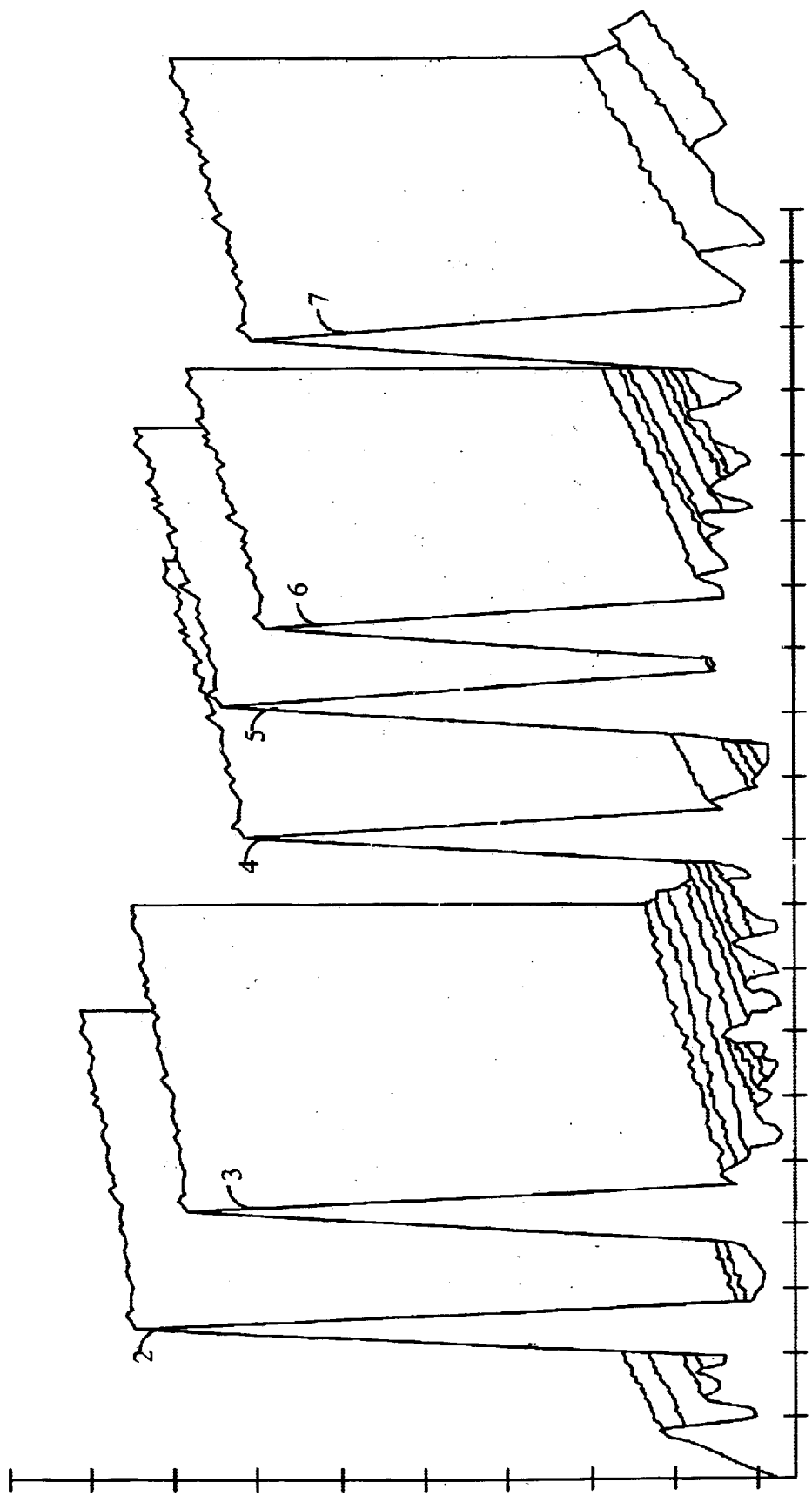
FIG. 1 represents an exemplary severe multipath signal condition.
Figure 2:
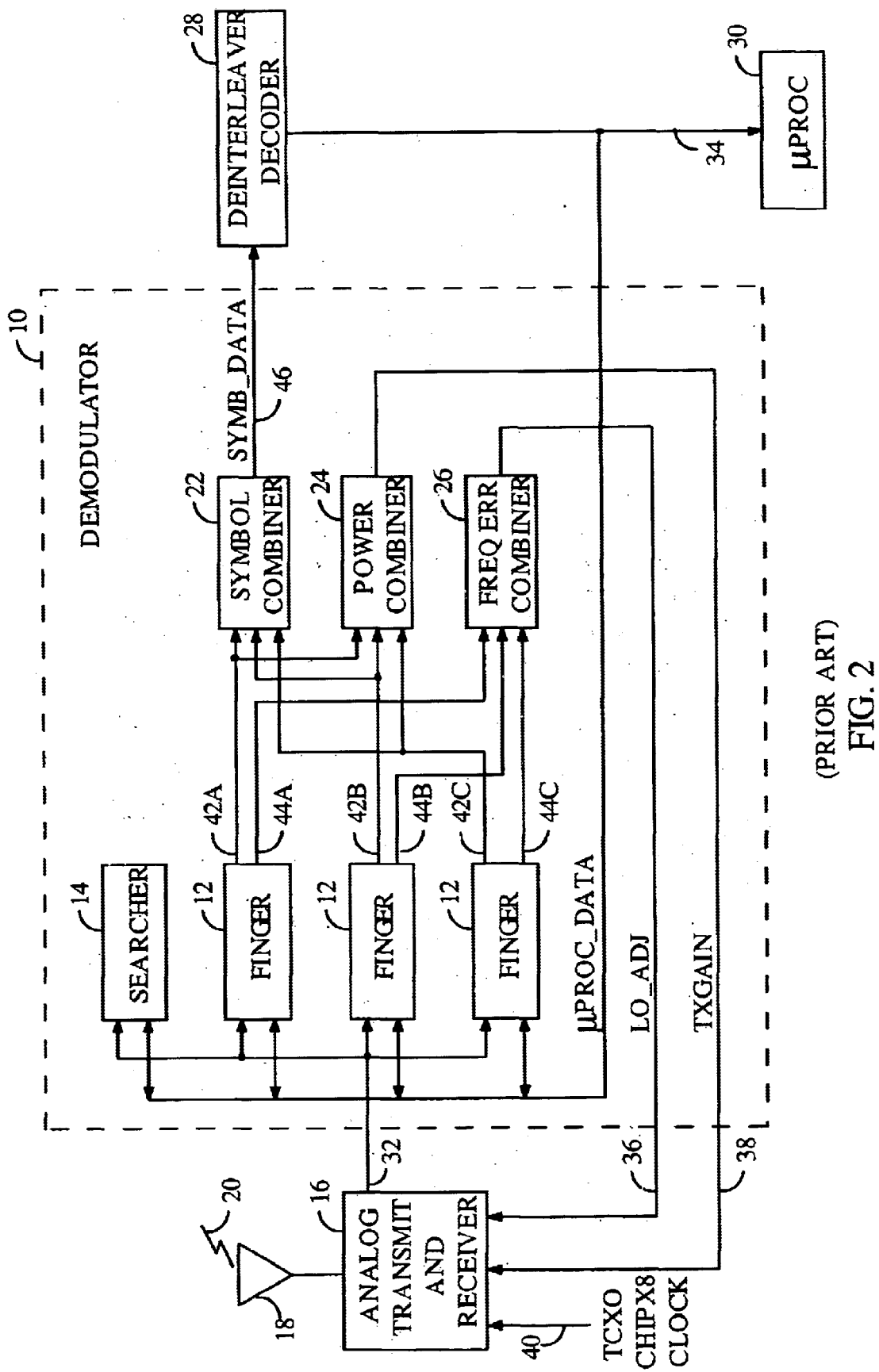
FIG. 2 is a block diagram of a current demodulation system.

As described with respect to FIG. 1, the signal demodulated by demodulator 200a followed a propagation path that took one PN chip longer to traverse than the propagation path upon which the signal demodulated by demodulator 200c followed. In order to properly combine the information, delay element 220 delays the data demodulated by demodulator 200c prior to combining with the demodulated data from demodulator 200a.

The same combining operation is performed with respect to the signals demodulated by demodulators 200b and 200d. Demodulators 200b and 200d demodulate signal that have traversed paths that differ by one half PN chip interval from the signals demodulated by demodulators 200a and 200c, respectively. The deskewing of the half chip path difference is not performed by a delays but rather is inherent in the performance of the signal combining operation in combiner element 224 which combines when the demodulated data from demodulators 200b and 200d is available to combiner element 224. This intrinsically means that the information from demodulators 200a and 200c was provided a half PN cycle earlier than the demodulated information from demodulators 200b and 200d in essence performing the additional deskewing operation. One skilled in the art will recognize that this operation could be performed by placing addition ½ PN chip delays on the outputs of demodulators 200b and 200d.

Moving to the detailed operation of the demodulator of FIG. 6, baseband samples at twice the PN chip rate are provided to switch 202. Switch 202 switches between outputs 198 and 199 at twice the rate of the PN chip cycle. The first base band sample is provided to demodulators 200a and 200c. The next baseband sample that arrives one half PN chip interval later is provided to demodulators 200b and 200d.

The first sample is provided through switch 202 on line 198 to demodulator 200a. The sample is PN descrambled in PN descrambling element 204a. In the exemplary embodiment, PN descrambling element 204a descrambles the sample in accordance with two PN sequences ($PN_I$ and $PN_Q$) provided by PN generator 206. The PN sequences are delayed by delay element 208 by one PN chip period. The complex despreading operation is performed as described above with respect to complex despreading element 150 of FIG. 5.

The complex PN descrambled sequences are provided to a first input of complex conjugate multiplier 212a and to pilot filter 210a. Complex conjugate multiplier removes phase ambiguities that are introduced by the propagation path. Pilot filter 210a uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 210a is simply a low pass filter which the noise from the pilot signal. The complex conjugate of the filtered pilot signal and the complex PN despread sequences are multiplied in complex conjugate multiplier 212a which computes the dot product of the pilot channel and the PN descrambled sequence to provide a scalar sequence to Walsh sequence multiplier 214a.

Walsh sequence multiplier 214a multiplies the input scalar sequence from complex conjugate multiplier 212a by the traffic channel Walsh sequence from Walsh generator 218 which is delayed by one PN chip interval by delay element 216. The multiplied sequence is then provided to combiner element 224.

The first sample is redundantly provided through switch 202 on line 198 to demodulator 200c. The sample is PN descrambled in PN descrambling element 204c. In the exemplary embodiment, PN descrambling element 204c descrambles the sample in accordance with two PN sequences ($PN_I$ and $PN_Q$) provided by PN generator 206. The PN sequences are provided directly to PN descrambling element 204c which results in the sample being demodulated by a PN sequence offset from the sequence used by demodulator 200a by one PN chip interval.

The complex PN descrambled sequences are provided to a first input of complex conjugate multiplier 212c and to pilot filter 210c. Pilot filter 210c uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 210c is simply a low pass filter which removes the noise from the pilot signal. The complex conjugate of the filtered pilot signal and the complex PN despread sequences are multiplied in complex conjugate multiplier 212c which computes the dot product of the pilot channel and the PN descrambled sequence to provide a scalar sequence to Walsh sequence multiplier 214c.

Walsh sequence multiplier 214c multiplies the input scalar sequence from complex conjugate multiplier 212c by the traffic channel Walsh sequence from Walsh generator 218. The multiplied sequence is then provided to summing means 224.

After one half PN chip interval, switch 202 toggles so as to put the next sample, received one half PN chip interval later, on input line 199 to demodulators 200b and 200d. Within demodulator 200b, the sample is PN descrambled in PN descrambling element 204b. As described previously PN descrambling element 204b descrambles the sample in accordance with two PN sequences ($PN_I$ and $PN_Q$) provided by PN generator 206b. The PN sequences are delayed by delay element 208 by one PN chip period.

The complex PN descrambled sequences are provided to a first input of complex conjugate multiplier 212b and to pilot filter 210b. Pilot filter 210b uncovers the pilot channel in accordance with the Walsh covering for the pilot channel $W_{pilot}$. In the exemplary embodiment, pilot filter 210b is simply a low pass filter which removes the noise from the pilot signal. The complex conjugate of the filtered pilot signal and the complex PN despread sequences are multiplied in complex conjugate multiplier 212b which computes the dot product of the pilot channel and the PN descrambled sequence to provide a scalar sequence to Walsh sequence multiplier 214b.

Walsh sequence multiplier 214b multiplies the input scalar sequence from complex conjugate multiplier 212b by the traffic channel Walsh sequence from Walsh generator 218 which is delayed by one PN chip interval by delay element 216. The multiplied sequence is then provided to combiner means 224.

The second sample is redundantly provided through switch 202 on line 199 to demodulator 200d. The second sample is PN descrambled in PN descrambling element 204d. In the exemplary embodiment, PN descrambling element 204d descrambles the sample in accordance with two PN sequences ($PN_I$ and $PN_Q$) provided by PN generator 206. The PN sequences are provided directly to PN descrambling element 204d which results in the sample being demodulated by a PN sequence offset from the sequence used by demodulator 200b by one PN chip interval.

The complex PN descrambled sequences are provided to a first input of complex conjugate multiplier 212d and to pilot filter 210d. Pilot filter 210c uncovers the pilot channel in accordance with the Walsh covering for the pilot channel $W_{pilot}$. In the exemplary embodiment, pilot filter 210d is simply a low pass filter that removes the noise from the pilot signal. The complex conjugate of the filtered pilot signal and the complex PN despread sequences are multiplied in complex conjugate multiplier 212d which computes the dot product of the pilot channel conjugate and the PN descrambled sequence to provide a scalar sequence to Walsh sequence multiplier 214d.

Walsh sequence multiplier 214d multiplies the input scalar sequence from complex conjugate multiplier 212d by a Walsh sequence from Walsh generator 218. The multiplied sequence is then provided to combiner 224.

After the demodulated signals from demodulators 200b and 200d have been provided to combiner element 224, combiner element 224 combines the energies and outputs the combined energy values to accumulator 226. Accumulator 226 performs the integration or summation of the input symbols over the Walsh symbol interval. Combiner element 224 can perform the combination in a variety of ways. Combiner element 224 could sum only demodulated data with energy above a threshold value or could sum all of the energies. Alternatively, combiner 224 could select the demodulated data with the greatest energy. In an alternative embodiment, combiner 224 combines the energy based on the power of the demodulated pilot from pilot filter 210. For the sake of clarity, optional lines from pilot filters 210 to combiner 224 have been omitted.

Figure 7:
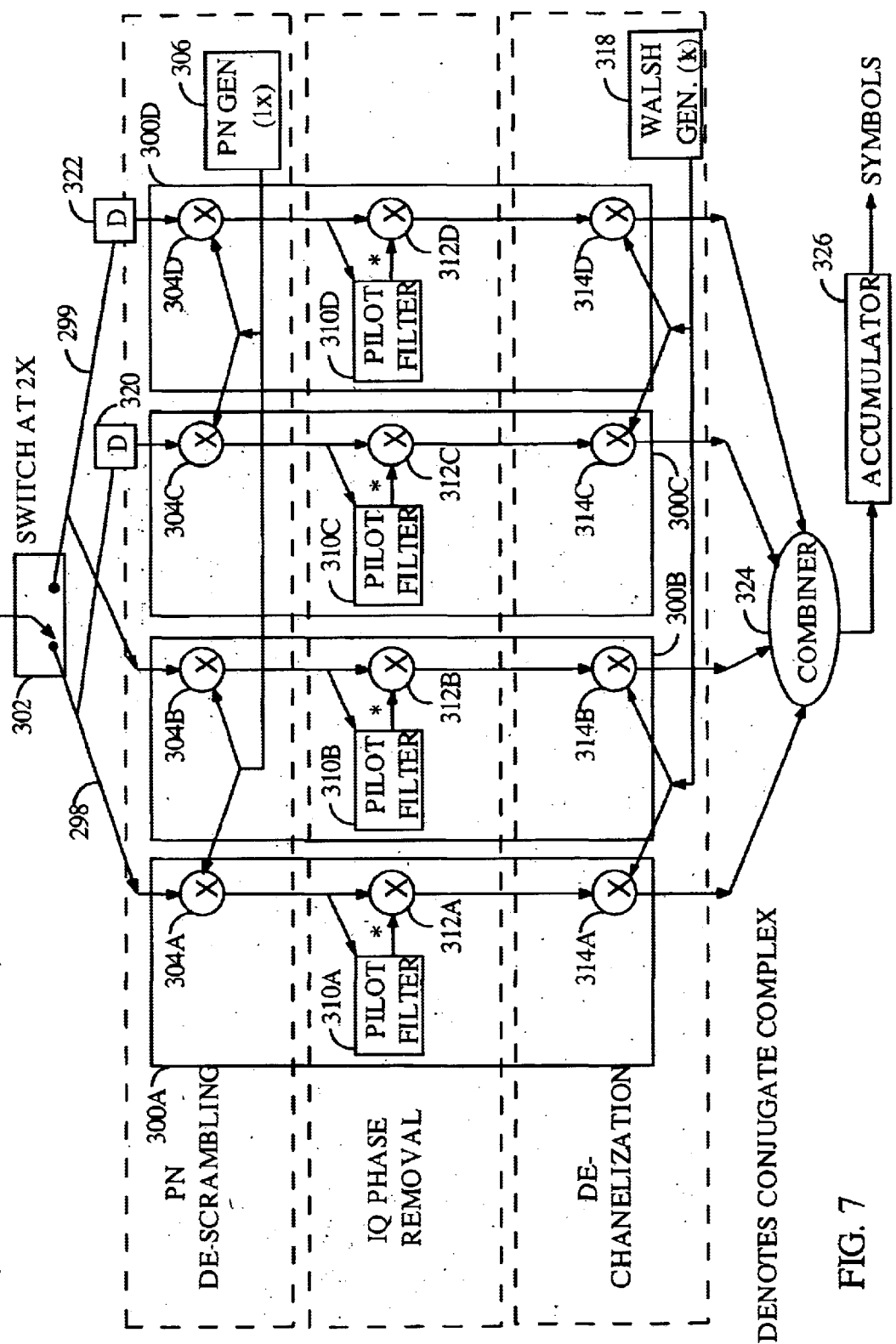
FIG. 7 is a second embodiment of the fat path demodulator of the present invention wherein four fingers are used to demodulate four multipath components with arrival times offset from one another by half of one PN chip wherein the received signal is delayed by varying amounts of times before being provided to the respective fingers.

In FIG. 7, a second fat path demodulator is illustrated where the delays are applied to the input signal instead of the demodulation elements. In FIG. 7, four demodulators 300a–300d are provided to demodulate paths that are a fixed half PN chip distance from one another. The demodulators move together demodulating PN offsets that are offset from one another by fixed increments. As described previously a microprocessor could be used to vary the amount of delay provided by delay elements 320 and 322. In the exemplary embodiment, one of the demodulators is the master and tracks the peak of set of multipath signals and the other demodulators act as slaves and follow the master demodulator. In the exemplary embodiment, a metric such as the power from pilot filter 210 can be used by the master finger to track the movement of the peak.

Demodulator 300a and demodulator 300c demodulate the received signal that are delayed with respect to one another by one PN chip interval. The signal provided to input 298 is provided directly to demodulator 300a. The signal is delayed by one PN chip interval by delay element 320 prior to being provided to demodulator 300c. If a first version of the transmitted signal traverses a first propagation path to be successfully demodulated by demodulator 300a, then a second version of the transmitted signal would need to traverse a second propagation path requiring a PN chip interval longer than the time required to traverse the first propagation path in order to be successfully demodulated by demodulator 300c.

Half of a PN chip interval later, switch 302 toggles to provide the sample taken half a chip interval later onto line 299. The second sample is provided directly to demodulator 300b and delayed by one PN chip interval by delay element 322 prior to being provided to demodulator 300d. This performs the path diversity combination as described above with respect to demodulators 300a and 300c.

The first sample is provided through switch 302 on line 298 to demodulator 300a. The sample is PN descrambled in PN descrambling element 304a. In the exemplary embodiment, PN descrambling element 204a descrambles the sample in accordance with two PN sequences ($PN_I$ and $PN_Q$) provided by PN generator 206. The complex despreading operation is performed as described above with respect to complex despreading element 150a.

The complex PN descrambled sequences are provided to a first input of complex conjugate multiplier 312a and to pilot filter 310a. Complex conjugate multiplier removes phase ambiguities that are introduced by the propagation path. Pilot filter 310a uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 310a is simply a low pass filter which removes the noise from the pilot signal. The complex conjugate of the filtered pilot signal and the complex PN despread sequences are multiplied in complex conjugate multiplier 312a which computes the dot product of the pilot channel conjugate and the PN descrambled sequence to provide a scalar sequence to Walsh sequence multiplier 314a.

Walsh sequence multiplier 314a multiplies the input scalar sequence from complex conjugate multiplier 312a by the Walsh traffic sequence from Walsh generator 318. The multiplied sequence is then provided to combiner element 224.

The first sample is redundantly provided through switch 302 on line 298 to delay element 320. Delay element 320 delays the signal by one PN chip interval prior to providing the sample to demodulator 300c. Thus, the signal successfully demodulated by demodulator 300c will have traversed a propagation path that required one PN chip less time to traverse than the path that was successfully demodulated by demodulator 300a. The sample is PN descrambled in PN descrambling element 304c. In the exemplary embodiment, PN descrambling element 304c descrambles the sample in accordance with two PN sequences ($PN_I$ and $PN_Q$) provided by PN generator 306.

The complex PN descrambled sequences are provided to a first input of complex conjugate multiplier 312c and to pilot filter 310c. Pilot filter 310c uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 310c is simply a low pass filter which removes the noise from the pilot signal. The complex conjugate of the filtered pilot signal and the complex PN despread sequences are multiplied in complex conjugate multiplier 212c which computes the dot product of the pilot channel conjugate and the PN descrambled sequence to provide a scalar sequence to Walsh sequence multiplier 214c.

Walsh sequence multiplier 314c multiplies the input scalar sequence from complex conjugate multiplier 312c by the Walsh traffic sequence from Walsh generator 318. The multiplied sequence is then provided to combiner element 324.

After one half PN chip interval, switch 302 toggles so as to put the next sample, received one half PN chip interval later, on input line 299 to demodulators 300b and 300d. Within demodulator 300b, the sample is PN descrambled in PN descrambling element 304b. In the exemplary embodiment, PN descrambling element 304b descrambles the sample in accordance with two PN sequences ($PN_I$ and $PN_Q$) provided by PN generator 306b.

The complex PN descrambled sequences are provided to a first input of complex conjugate multiplier 312b and to pilot filter 310b. Pilot filter 310b uncovers the pilot channel in accordance with the Walsh covering for the pilot channel $W_{pilot}$. In the exemplary embodiment, pilot filter 310b is simply a low pass filter which removes the noise from the pilot signal. The complex conjugate of the filtered pilot signal and the complex PN despread sequences are multiplied in complex conjugate multiplier 312b which computes the dot product of the pilot channel conjugate and the PN descrambled sequence to provide a scalar sequence to Walsh sequence multiplier 314b.

Walsh sequence multiplier 314b multiplies the input scalar sequence from complex conjugate multiplier 312b by the Walsh traffic sequence from Walsh generator 318 which is delayed by one PN chip interval by delay element 316. The multiplied sequence is then provided to combiner element 324.

The second sample is redundantly provided through switch 302 on line 299 to delay element 322. Delay element 322 delays the signal by one PN chip interval prior to providing it to demodulator 300d. Demodulator 300d successfully demodulates a signals that traversed a path that took one PN chip less time to traverse than the path successfully demodulated by demodulator 300b. The second sample is PN descrambled in PN descrambling element 304d. In the exemplary embodiment, PN descrambling element 304d descrambles the sample in accordance with two PN sequences ($PN_I$ and $PN_Q$) provided by PN generator 306.

The complex PN descrambled sequences are provided to a first input of complex conjugate multiplier 312d and to pilot filter 310d. Pilot filter 310d uncovers the pilot channel in accordance with the Walsh covering for the pilot channel $W_{pilot}$. In the exemplary embodiment, pilot filter 310d is simply a low pass filter that removes the noise from the pilot signal. The complex conjugate of the filtered pilot signal and the complex PN despread sequences are multiplied in complex conjugate multiplier 312d which computes the dot product of the pilot channel conjugate and the PN descrambled sequence to provide a scalar sequence to Walsh sequence multiplier 314d.

Walsh sequence multiplier 314d multiplies the input scalar sequence from complex conjugate multiplier 312d by the Walsh traffic sequence from Walsh generator 318. The multiplied sequence is then provided to combiner element 324.

After the demodulated signals from demodulators 300b and 300d have been provided to combiner element 324, combiner element 324 combines the energies and outputs the combined energy values to accumulator 326. As described earlier, the combining operation can take many forms all of which are within the scope of the present invention. Accumulator 326 performs the integration or summation of the input symbols over the Walsh symbol interval.

Figure 8:
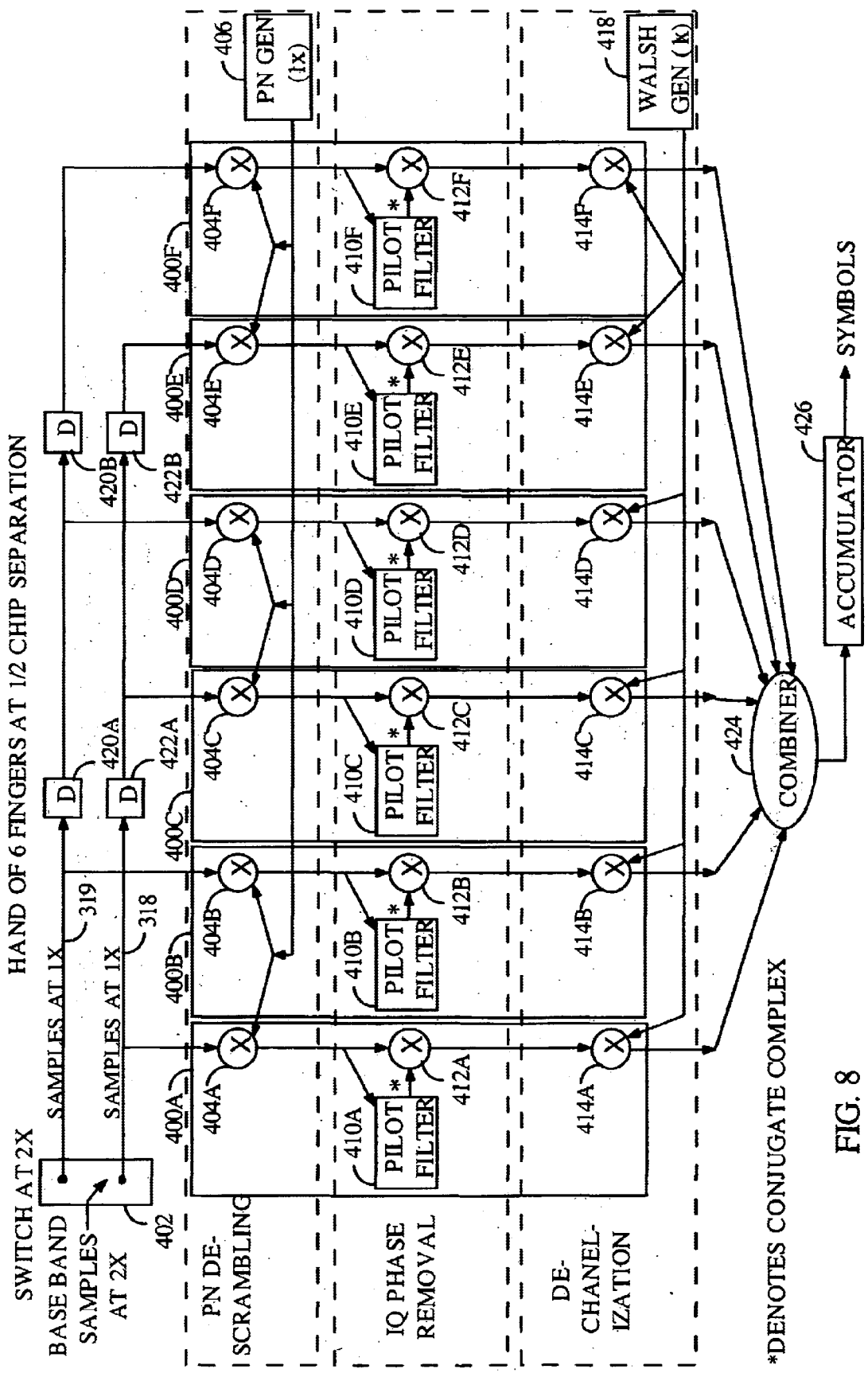
FIG. 8 is a third embodiment of the fat path demodulator of the present invention wherein six fingers are used to demodulate six multipath components with arrival times offset from one another by half of one PN chip wherein the received signal is delayed by varying amounts of times before being provided to the respective fingers.

Turning to FIG. 8. demodulators 400a, 400c and 400e demodulate the received signal delayed with respect to one another by one PN chip interval. Similarly, demodulators 400b, 400d and 400f demodulate a second set of samples delayed with respect to one another by one PN chip interval. The theory behind the operation of the demodulator of FIG. 8 is identical to that of FIG. 7. Each demodulator demodulates the signal that traversed a path that required a time to traverse differing from one another by one half PN chip interval.

The first sample is provided through switch 402 onto line 398 to demodulator 400a. The sample is PN descrambled in PN descrambling element 404a. In the exemplary embodiment, PN descrambling element 404a descrambles the sample in accordance with two PN sequences ($PN_I$ and $PN_Q$) provided by PN generator 406 as described previously.

The complex PN descrambled sequences are provided to a first input of complex conjugate multiplier 412a and to pilot filter 410a. Complex conjugate multiplier 412a removes phase ambiguities that are introduced by the propagation path. Pilot filter 410a uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 410a is simply a low pass filter which removes the noise from the pilot signal. The complex conjugate of the filtered pilot signal and the complex PN despread sequences are multiplied in complex conjugate multiplier 412a which computes the dot product of the pilot channel conjugate and the PN descrambled sequence to provide a scalar sequence to Walsh sequence multiplier 414a.

Walsh sequence multiplier 414a multiplies the input scalar sequence from complex conjugate multiplier 412a by the Walsh traffic sequence from Walsh generator 418. The multiplied sequence is then provided to combiner element 424.

The first sample is redundantly provided through switch 402 on line 398 to delay element 420. Delay element 420 delays the signal by one PN chip interval prior to providing the sample to demodulator 400c. Thus, the signal successfully demodulated by demodulator 400c will have traversed a propagation path that required one PN chip less time to traverse than the path that was successfully demodulated by demodulator 400a. The sample is PN descrambled in PN descrambling element 404c. In the exemplary embodiment, PN descrambling element 404c descrambles the sample in accordance with two PN sequences ($PN_I$ and $PN_Q$) provided by PN generator 406.

The complex PN descrambled sequences are provided to a first input of complex conjugate multiplier 412c and to pilot filter 410c. Pilot filter 410c uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 410c is simply a low pass filter which removes the noise from the pilot signal. The complex conjugate of the filtered pilot signal and the complex PN despread sequences are multiplied in complex conjugate multiplier 412c which computes the dot product of the pilot channel conjugate and the PN descrambled sequence to provide a scalar sequence to Walsh sequence multiplier 414c.

Walsh sequence multiplier 414c multiplies the input scalar sequence from complex conjugate multiplier 412c by Walsh traffic sequence from Walsh generator 418. The multiplied sequence is then provided to combiner element 424.

The first sample is also redundantly provided through delay element 422a to delay element 422b. Delay element 422b delays the signal by one additional PN chip interval prior to providing the sample to demodulator 400e. Thus, the signal successfully demodulated by demodulator 400e will have traversed a propagation path that required one PN chip less time to traverse than the path that was successfully demodulated by demodulator 400c and two PN chip intervals less that the signal successfully demodulated by demodulator 400a. The sample is PN descrambled in PN descrambling element 404e. In the exemplary embodiment, PN descrambling element 404e descrambles the sample in accordance with two PN sequences ($PN_I$ and $PN_Q$) provided by PN generator 406.

The complex PN descrambled sequences are provided to a first input of complex conjugate multiplier 412e and to pilot filter 410e. Pilot filter 410e uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 410e is simply a low pass filter which removes the noise from the pilot signal. The complex conjugate of the filtered pilot signal and the complex PN despread sequences are multiplied in complex conjugate multiplier 412e which computes the dot product of the pilot channel conjugate and the PN descrambled sequence to provide a scalar sequence to Walsh sequence multiplier 414e.

Walsh sequence multiplier 414e multiplies the input scalar sequence from complex conjugate multiplier 412e by the Walsh traffic sequence from Walsh generator 418. The multiplied sequence is then provided to combiner element 424.

After one half PN chip interval, switch 402 toggles so as to put the next sample, received one half PN chip interval later, on input line 399 to demodulators 400b, 400d and 400f.

Within demodulator 400b, the sample is PN descrambled in PN descrambling element 404b. In the exemplary embodiment, PN descrambling element 404b descrambles the sample in accordance with two PN sequences ($PN_I$ and $PN_Q$) provided by PN generator 406b. The complex PN descrambled sequences are provided to a first input of complex conjugate multiplier 412b and to pilot filter 410b. Pilot filter 410b uncovers the pilot channel in accordance with the Walsh covering for the pilot channel $W_{pilot}$. In the exemplary embodiment, pilot filter 410b is simply a low pass filter which removes the noise from the pilot signal. The complex conjugate of the filtered pilot signal and the complex PN despread sequences are multiplied in complex conjugate multiplier 412b which computes the dot product of the pilot channel conjugate and the PN descrambled sequence to provide a scalar sequence to Walsh sequence multiplier 414b.

Walsh sequence multiplier 414b multiplies the input scalar sequence from complex conjugate multiplier 412b by Walsh traffic sequence from Walsh generator 418. The multiplied sequence is then provided to combiner 424.

The second sample is redundantly provided through switch 402 on line 399 to delay element 420a. Delay element 420a delays the signal by one PN chip interval prior to providing it to demodulator 400d. Demodulator 400d successfully demodulates a signals that traversed a path that took one PN chip less time to traverse than the path successfully demodulated by demodulator 400b. The second sample is PN descrambled in PN descrambling element 404d. In the exemplary embodiment, PN descrambling element 404d descrambles the sample in accordance with two PN sequences ($PN_I$ and $PN_Q$) provided by PN generator 406.

The complex PN descrambled sequences are provided to a first input of complex conjugate multiplier 412d and to pilot filter 410d. Pilot filter 410d uncovers the pilot channel in accordance with the Walsh covering for the pilot channel $W_{pilot}$. In the exemplary embodiment, pilot filter 410d is simply a low pass filter that removes the noise from the pilot signal. The complex conjugate of the filtered pilot signal and the complex PN despread sequences are multiplied in complex conjugate multiplier 412d which computes the dot product of the pilot channel conjugate and the PN descrambled sequence to provide a scalar sequence to Walsh sequence multiplier 414d.

Walsh sequence multiplier 414d multiplies the input scalar sequence from complex conjugate multiplier 412d by a Walsh sequence from Walsh generator 418. The multiplied sequence is then provided to combiner 424.

The second sample is redundantly provided through delay element 420a to delay element 420b. Delay element 420b delays the signal by one additional PN chip interval prior to providing the sample to demodulator 400f. Thus, the signal successfully demodulated by demodulator 400f will have traversed a propagation path that required one PN chip less time to traverse than the path that was successfully demodulated by demodulator 400d and two PN chip intervals less that the signal successfully demodulated by demodulator 400b. The sample is PN descrambled in PN descrambling element 404f. In the exemplary embodiment, PN descrambling element 404f descrambles the sample in accordance with two PN sequences ($PN_I$ and $PN_Q$) provided by PN generator 406.

The complex PN descrambled sequences are provided to a first input of complex conjugate multiplier 412f and to pilot filter 410f. Pilot filter 410f uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 410f is simply a low pass filter which removes the noise from the pilot signal. The complex conjugate of the filtered pilot signal and the complex PN despread sequences are multiplied in complex conjugate multiplier 412f which computes the dot product of the pilot channel conjugate and the PN descrambled sequence to provide a scalar sequence to Walsh sequence multiplier 414f.

Walsh sequence multiplier 414f multiplies the input scalar sequence from complex conjugate multiplier 412f by a Walsh sequence from Walsh generator 418. The multiplied sequence is then provided to summing means 424.

After the demodulated signals from demodulators 400b, 400d and 400f have been provided to summing element 424, summing element 424 sums the energies and outputs the summed energy values to accumulator 426. Accumulator 426 performs the integration or summation of the input symbols over the Walsh symbol interval.

Figure 9:
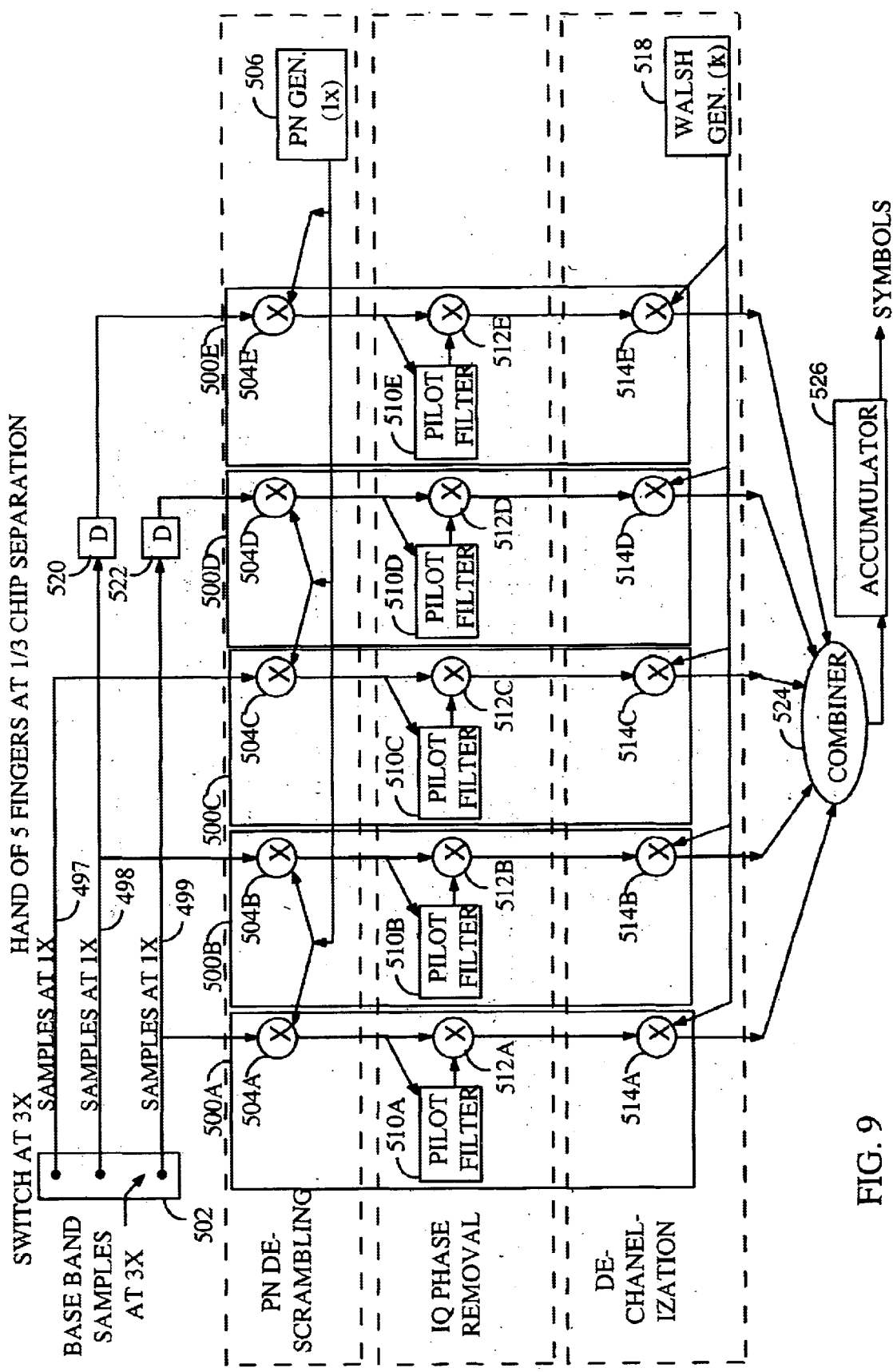
FIG. 9 is a fourth embodiment of the fat path demodulator of the present invention wherein five fingers are used to demodulate five multipath components with arrival times offset from one another by one third of one PN chip wherein the received signal is delayed by varying amounts of times before being provided to the respective fingers.

Turning to FIG. 9, the baseband samples are provide to the fat finger demodulator illustrated in FIG. 9 at three times the PN chip rate. The baseband samples are provided to switch 502 which switches each subsequent sample to a different line. Demodulators 500a and 500d demodulate the received signal that are delayed with respect to one another by one PN chip interval. Similarly, demodulators 500b and 500e demodulate a second set of samples delayed with respect to one another by one PN chip interval. Lastly, demodulator 500c demodulates a set of samples that is unique from those provided to demodulators 500a, 500b, 500d and 500e. The theory behind the operation of the demodulator of FIG. 9 is identical to that of FIG. 8. Each demodulator demodulates the signal that traversed a path that required a time to traverse differing from one another by one half PN chip interval.

The first sample is provided through switch 502 onto line 499 to demodulator 500a. The sample is PN descrambled in PN descrambling element 504a. In the exemplary embodiment, PN descrambling element 504a descrambles the sample in accordance with two PN sequences ($PN_I$ and $PN_Q$) provided by PN generator 506.

The complex PN descrambled sequences are provided to a first input of complex conjugate multiplier 512a and to pilot filter 510a. Complex conjugate multiplier 512a removes phase ambiguities that are introduced by the propagation path. Pilot filter 510a uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 510a is simply a low pass filter which removes the noise from the pilot signal. The complex conjugate of the filtered pilot signal and the complex PN despread sequences are multiplied in complex conjugate multiplier 512a which computes the dot product of the pilot channel conjugate and the PN descrambled sequence to provide a scalar sequence to Walsh sequence multiplier 514a.

Walsh sequence multiplier 514a multiplies the input scalar sequence from complex conjugate multiplier 512a by the Walsh traffic sequence from Walsh generator 518. The multiplied sequence is then provided to combiner 524.

The first sample is redundantly provided through switch 502 on line 499 to delay element 522. Delay element 522 delays the signal by one PN chip interval prior to providing the sample to demodulator 500d. Thus, the signal successfully demodulated by demodulator 500d will have traversed a propagation path that required one PN chip less time to traverse than the path that was successfully demodulated by demodulator 500a. The sample is PN descrambled in PN descrambling element 504d. In the exemplary embodiment, PN descrambling element 504d descrambles the sample in accordance with two PN sequences ($PN_I$ and $PN_Q$) provided by PN generator 506.

The complex PN descrambled sequences are provided to a first input of complex conjugate multiplier 512d and to pilot filter 510d. Pilot filter 510c uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 510d is simply a low pass filter which removes the noise from the pilot signal. The complex conjugate of the filtered pilot signal and the complex PN despread sequences are multiplied in complex conjugate multiplier 512d which computes the dot product of the pilot channel conjugate and the PN descrambled sequence to provide a scalar sequence to Walsh sequence multiplier 514d.

Walsh sequence multiplier 514d multiplies the input scalar sequence from complex conjugate multiplier 512d by the Walsh traffic sequence from Walsh generator 518. The multiplied sequence is then provided to combiner 524.

After one third PN chip interval, switch 502 toggles so as to put the next sample on input line 498 to demodulators 500b and 500e.

Within demodulator 500b, the sample is PN descrambled in PN descrambling element 504b. In the exemplary embodiment, PN descrambling element 504b descrambles the sample in accordance with two PN sequences ($PN_I$ and $PN_Q$) provided by PN generator 506. The complex PN descrambled sequences are provided to a first input of complex conjugate multiplier 512b and to pilot filter 510b. Pilot filter 510b uncovers the pilot channel in accordance with the Walsh covering for the pilot channel $W_{pilot}$. In the exemplary embodiment, pilot filter 510b is simply a low pass filter which removes the noise from the pilot signal. The complex conjugate of the filtered pilot signal and the complex PN despread sequences are multiplied in complex conjugate multiplier 512b which computes the dot product of the pilot channel conjugate and the PN descrambled sequence to provide a scalar sequence to Walsh sequence multiplier 514b.

Walsh sequence multiplier 514b multiplies the input scalar sequence from complex conjugate multiplier 512b by Walsh traffic sequence from Walsh generator 518. The multiplied sequence is then provided to combiner 524.

The second sample is redundantly provided through switch 502 on line 498 to delay element 520. Delay element 520 delays the signal by one PN chip interval prior to providing it to demodulator 500e. Demodulator 500e successfully demodulates a signals that traversed a path that took one PN chip less time to traverse than the path successfully demodulated by demodulator 500b. The second sample is PN descrambled in PN descrambling element 504e. In the exemplary embodiment, PN descrambling element 504e descrambles the sample in accordance with two PN sequences $PN_I$ and $PN_Q$) provided by PN generator 506.

The complex PN descrambled sequences are provided to a first input of complex conjugate multiplier 512e and to pilot filter 510e. Pilot filter 510e uncovers the pilot channel in accordance with the Walsh covering for the pilot channel $W_{pilot}$. In the exemplary embodiment, pilot filter 510e is simply a low pass filter that removes the noise from the pilot signal. The complex conjugate of the filtered pilot signal and the complex PN despread sequences are multiplied in complex conjugate multiplier 512e which computes the dot product of the pilot channel conjugate and the PN descrambled sequence to provide a scalar sequence to Walsh sequence multiplier 514e.

Walsh sequence multiplier 514e multiplies the input scalar sequence from complex conjugate multiplier 512e by the Walsh traffic sequence from Walsh generator 518. The multiplied sequence is then provided to combiner 524.

One third of a PN chip interval later, switch 502 switches so as to provide the third base band sample onto output line 497, which provides the sample directly to demodulator 500c. The sample is PN descrambled in PN descrambling element 504c. In the exemplary embodiment, PN descrambling element 504c descrambles the sample in accordance with two PN sequences ($PN_I$ and $PN_Q$) provided by PN generator 506.

The complex PN descrambled sequences are provided to a first input of complex conjugate multiplier 512c and to pilot filter 510c. Pilot filter 510c uncovers the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 510c is simply a low pass filter which removes the noise from the pilot signal. The complex conjugate of the filtered pilot signal and the complex PN despread sequences are multiplied in complex conjugate multiplier 512c which computes the dot product of the pilot channel conjugate and the PN descrambled sequence to provide a scalar sequence to Walsh sequence multiplier 514c.

Walsh sequence multiplier 514c multiplies the input scalar sequence from complex conjugate multiplier 512c by the Walsh traffic sequence from Walsh generator 518 and provides the result to combiner 524 combines the energies of the demodulated signals from demodulators 500a, 500b, 500c, 500d and 500e and provides the result to accumulator 526. As described previously there are many alternative methods of combining the demodulated data all of which are within the scope of the present invention. Accumulator 526 accumulates the combined energy values over the Walsh symbol interval and outputs the result.

Figure 10:
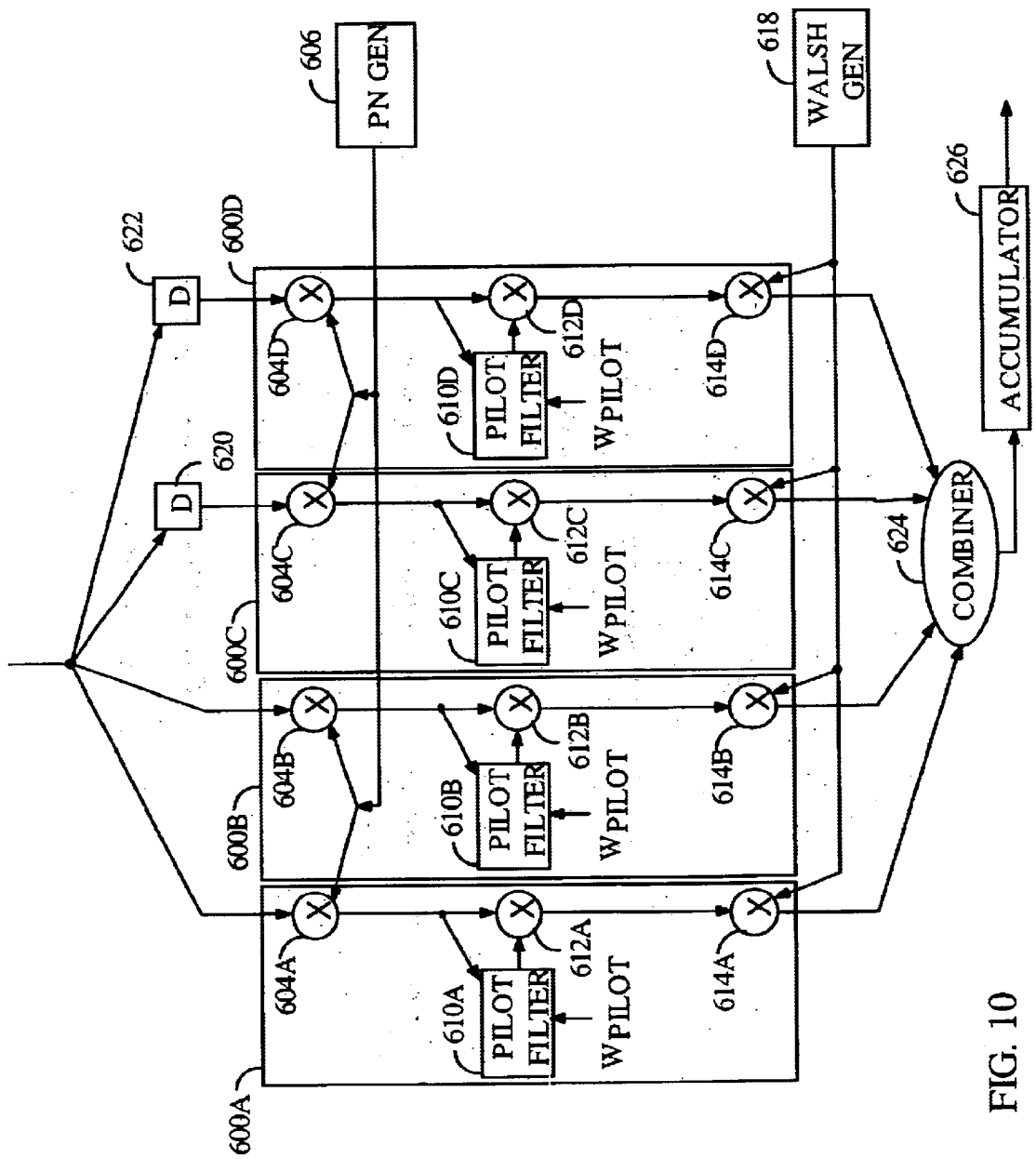
FIG. 10 illustrates an alternative embodiment that allows for elimination of the input switch.

FIG. 10 illustrates a modification to FIG. 7 which is applicable to all of the previous embodiments illustrated in FIGS. 6, 7, 8 and 9. FIG. 10 illustrates a modification to FIG. 7 which allows for the elimination of switch 302. In FIG. 10, four demodulators 600a, 600b, 600c and 600d are provided to demodulate paths that are a fixed half PN chip distance from one another. The received samples are provided at twice the PN chip rate to demodulators 600a, 600b, 600c and 600d. Pilot filters 610a and 610c ignore the even samples and pilot filters 610b and 610d ignore the odd samples. Combiner 624 only combines demodulated odd samples from demodulators 600a and 600c with demodulated even samples from demodulators 600b and 600d.

The first sample is provided directly to demodulators 600a and 600b and is delayed by one PN chip interval by delay elements 620 and 622 before being provided to demodulators 600c and 600d, respectively. The sample is PN descrambled in PN descrambling elements 604a, 604b, 604c and 604d. In the exemplary embodiment, PN descrambling elements 604a, 604b, 604c and 604d descramble the sample in accordance with two PN sequences (PN$_I$ and PN$_Q$) provided by PN generator 606. The complex descrambling operation is performed as described above with respect to complex despreading element 150a.

The complex PN descrambled sequences are provided to a first input of complex conjugate multiplier 612a, 612b, 612c and 612d and to pilot filter 610a, 610b, 610c and 610d. Complex conjugate multiplier removes phase ambiguities that are introduced by the propagation path. Pilot filters 610b and 610d ignore the first sample and all future odd samples. Pilot filters 610a and 610c uncover the pilot channel in accordance with the Walsh covering for the pilot channel W$_{pilot}$. In the exemplary embodiment, W$_{pilot}$ is the all zeroes Walsh sequence for which the uncovering operation is a No Op. In this special case, pilot filter 610a and 610c are simply low pass filters which remove the noise from the pilot signal. The complex conjugate of the filtered pilot signal and the complex PN despread sequences are multiplied in complex conjugate multipliers 612a and 612c which compute the dot product of the pilot channel conjugate and the PN descrambled sequence to provide scalar sequences to Walsh sequence multipliers 614a and 614c.

Walsh sequence multipliers 614a and 614c multiply the input scalar sequence from complex conjugate multipliers 612a and 612c by the Walsh traffic sequence from Walsh generator 618. The multiplied sequence is then provided to combiner element 624. Note that although PN descrambling and Walsh multiplication are provided on the first sample by demodulators 600b and 600d, combiner 624 ignores the data provided from demodulators 600b and 600d for odd samples as erroneous.

The second sample is, then, provided directly to demodulators 600a and 600b and is delayed by one PN chip interval by delay elements 620 and 622 before being provided to demodulators 600c and 600d, respectively. The sample is PN descrambled in PN descrambling elements 604a, 604b, 604c and 604d. In the exemplary embodiment, PN descrambling elements 604a, 604b, 604c and 604d descramble the sample in accordance with two PN sequences PN$_I$ and PN$_Q$) provided by PN generator 606. The complex descrambling operation is performed as described above with respect to complex despreading element 150a.

The complex PN descrambled sequences are provided to a first input of complex conjugate multiplier 612a, 612b, 612c and 612d and to pilot filter 610a, 610b, 610c and 610d. Complex conjugate multipliers remove phase ambiguities that are introduced by the propagation path. Pilot filters 610a and 610c ignore the second sample and all future even samples. Pilot filters 610b and 610d uncover the pilot channel in accordance with the Walsh covering for the pilot channel W$_{pilot}$. In the exemplary embodiment, W$_{pilot}$ is the all zeroes Walsh sequence for which the uncovering operation is a No Op. In this special case, pilot filter 610b and 610d are simply low pass filters which remove the noise from the pilot signal. The complex conjugate of the filtered pilot signal and the complex PN despread sequences are multiplied in complex conjugate multipliers 612b and 612d which compute the dot product of the pilot channel conjugate and the PN descrambled sequence to provide scalar sequences to Walsh sequence multipliers 614b and 614d.

Walsh sequence multipliers 614b and 614d multiply the input scalar sequence from complex conjugate multiplier 612b and 612d by the Walsh traffic sequence from Walsh generator 618. The multiplied sequence is then provided to combiner element 624. Note that although PN descrambling and Walsh multiplication are provided on the second sample by demodulators 600a and 600c, combiner 624 ignores the data provided from demodulators 600b and 600d for odd samples as erroneous.

After the demodulated signals from demodulators 600b and 600d have been provided to combiner element 624, combiner element 624 combines the energies and outputs the combined energy values to accumulator 626. As described earlier, the combining operation can take many forms all of which are within the scope of the present invention. Accumulator 626 performs the integration or summation of the input symbols over the Walsh symbol interval.

Figure 11:
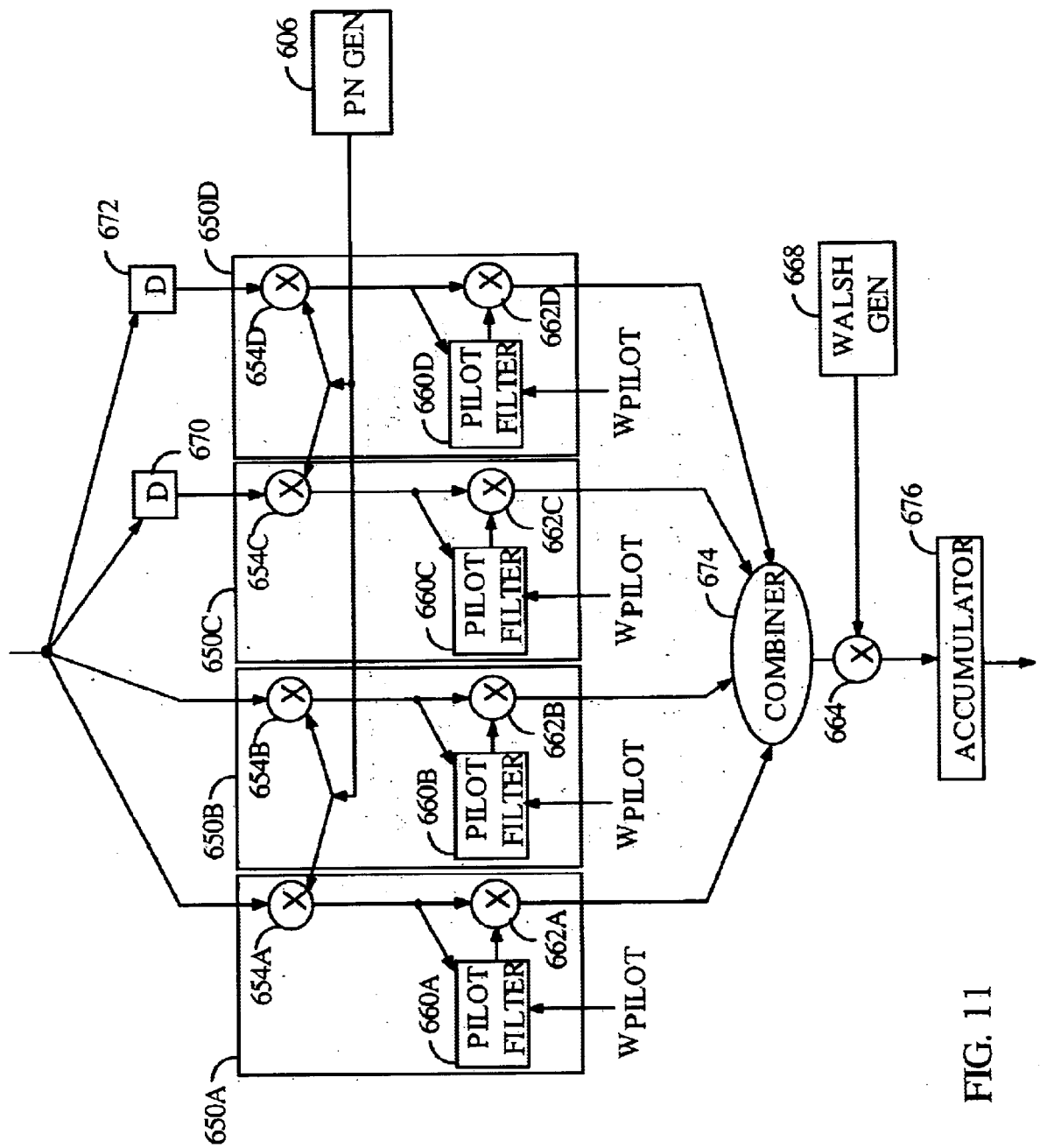
FIG. 11 illustrates an alternative embodiment that allows for eleimination of all but one Walsh sequence multiplier.

FIG. 11 illustrates a modification to FIG. 10 which is applicable to all of the previous embodiments illustrated in FIGS. 6, 7, 8 and 9. FIG. 11 illustrates a modification to FIG. 10 which allows for the elimination of all but one Walsh multiplier. In FIG. 10, four demodulators 650a, 650b, 650c and 650d are provided to demodulate paths that are a fixed half PN chip distance from one another. The received samples are provided at twice the PN chip rate to demodulators 650a, 650b, 650c and 650d. Pilot filters 660a and 660c ignore the even samples and pilot filters 660b and 660d ignore the odd samples. Combiner 674 only combines demodulated odd samples from demodulators 650a and 650c with demodulated even samples from demodulators 650b and 650d.

The first sample is provided directly to demodulators 650a and 650b and is delayed by one PN chip interval by delay elements 670 and 672 before being provided to demodulators 650c and 650d, respectively. The sample is PN descrambled in PN descrambling elements 654a, 654b, 654c and 654d. In the exemplary embodiment, PN descrambling elements 654a, 654b, 654c and 654d descramble the sample in accordance with two PN sequences (PN$_I$ and PN$_Q$) provided by PN generator 656.

The complex PN descrambled sequences are provided to a first input of complex conjugate multipliers 662a, 662b, 662c and 662d and to pilot filters 660a, 660b, 660c and 660d. Complex conjugate multipliers remove phase ambiguities that are introduced by the propagation path. Pilot filters 660*b* and 660*d* ignore the first sample and all future odd samples. Pilot filters 660*a* and 660*c* uncover the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filter 660*a* and 660*c* are simply low pass filters which remove the noise from the pilot signal.

The complex conjugate of the filtered pilot signal and the complex PN despread sequences are multiplied in complex conjugate multipliers 662*a* and 662*c* which compute the dot product of the pilot channel conjugate and the PN descrambled sequence to provide scalar sequences to combiner 674. Note that although PN descrambling and Walsh multiplication are provided on the first sample by demodulators 650*b* and 650*d*, combiner 674 ignores the data provided from demodulators 650*b* and 650*d* for odd samples as erroneous.

The second sample is, then, provided directly to demodulators 650*a* and 650*b* and is delayed by one PN chip interval by delay elements 620 and 622 before being provided to demodulators 650*c* and 650*d*, respectively. The sample is PN descrambled in PN descrambling elements 654*a*, 654*b*, 654*c* and 654*d*. In the exemplary embodiment, PN descrambling elements 654*a*, 654*b*, 654*c* and 654*d* descramble the sample in accordance with two PN sequences ($PN_I$ and $PN_Q$) provided by PN generator 656. The complex descrambling operation is performed as described above with respect to complex despreading element 150*a*.

The complex PN descrambled sequences are provided to a first input of complex conjugate multipliers 662*a*, 662*b*, 662*c* and 662*d* and to pilot filters 660*a*, 660*b*, 660*c* and 660*d*. Complex conjugate multipliers remove phase ambiguities that are introduced by the propagation path. Pilot filters 660*a* and 660*c* ignore the second sample and all future even samples.

Pilot filters 660*b* and 660*d* uncover the pilot channel in accordance with the Walsh covering for the pilot channel $W_{pilot}$. In the exemplary embodiment, $W_{pilot}$ is the all zeroes Walsh sequence for which the uncovering operation is a No Op. In this special case, pilot filters 660*b* and 660*d* are simply low pass filters which removes the noise from the pilot signal. The complex conjugate of the filtered pilot signal and the complex PN despread sequences are multiplied in complex conjugate multiplier 662*b* and 662*d* which compute the dot product of the pilot channel conjugate and the PN descrambled sequence to provide scalar sequences to combiner 674.

Combiner 674 combines the odd samples demodulated by demodulators 650*a* and 650*c* with the even samples demodulated by demodulators 650*b* and 650*d*. Combiner 674 can take many forms as discussed previously with respect to the previous combiners. The combined symbols are then provided to Walsh sequence multiplier 664.

Walsh sequence multiplier 664 multiplies the combined symbol sequence by the Walsh traffic sequence $W_{Traffic}$ which is provided by Walsh sequence generator 668. The output from Walsh sequence multiplier 664 is provided to accumulator 676. Accumulator 676 accumulates the Walsh multiplied sequence to provide Walsh despread data.

Figure 12:
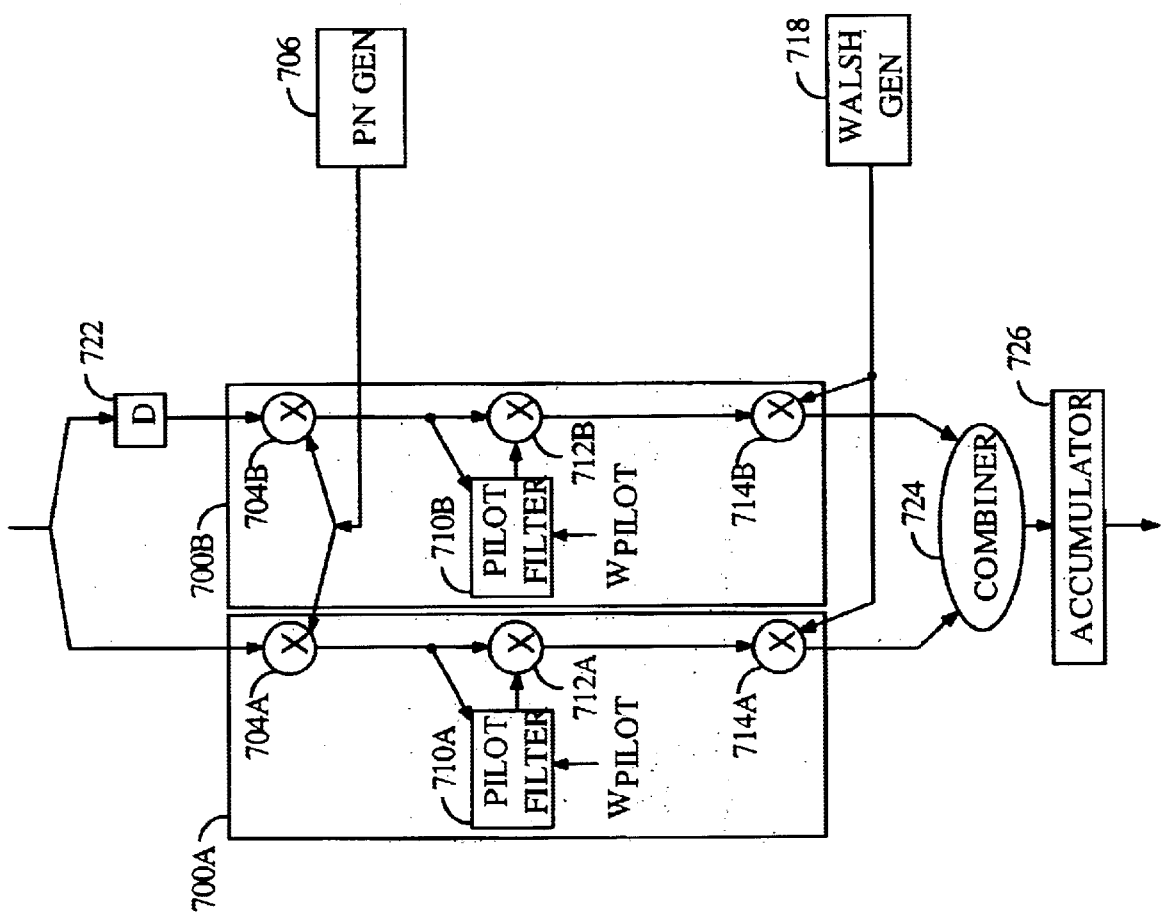
FIG. 12 illustrates an alternative embodiment that allows for the elimination of two demodulator structures.

FIG. 12 illustrates a modification to FIG. 7 which is equally applicable to the modification of FIGS. 6, 7, 8 and 9. FIG. 12 provides for the demodulation of four paths that are one half PN chip apart using two demodulators. Demodulator 700*a* demodulates two paths that are one half PN chip apart and Demodulator 700*b* demodulates two additional paths that are one half PN chip apart from one another and one full PN chip from the paths demodulated by demodulator 700*a*.

The samples are provided at twice the PN chip rate. The samples are provided directly to demodulator 700*a* and are delayed by one PN chip prior to being provided to demodulator 700*b*. The sample is PN descrambled in PN descrambling elements 704*a* and 704*b*. In the exemplary embodiment, PN descrambling elements 704*a* and 704*b* descramble the sample in accordance with two PN sequences ($PN_I$ and $PN_Q$) provided by PN generator 706. The complex descrambling operation is performed as described above with respect to complex despreading element 150*a*.

The complex PN descrambled sequences are provided to a first input of complex conjugate multiplier 712*a* and 712*b* and to pilot filter 710*a* and 710*b*. Complex conjugate multipliers remove phase ambiguities that are introduced by the propagation path.

In the first embodiment of pilot filters 710*a* and 710*b*, pilot filters 710*a* and 710*b* consist of two independent filters. A first of the two independent filters processes the odd samples and a second of the two independent filters processes the even samples.

In this embodiment, a first sample is provided to pilot filter 710*a* and 710*b*, and is processed by the independent filter within it which processes the odd samples. The output of the pilot filters 710*a* and 710*b* are provided to complex conjugate multipliers 712*a* and 712*b* which multiply the conjugate of the pilot filter output with the descrambled signal from PN descrambling element 704*a* and 704*b*. Note the odd descrambled symbols are complex multiplied by the odd pilot symbols.

In this embodiment, a second sample is provided to pilot filter 710*a* and 710*b*, and is processed by the independent filter within it which processes the even samples. The output of the pilot filters 710*a* and 710*b* are provided to complex conjugate multipliers 712*a* and 712*b* which multiply the conjugate of the pilot filter output with the descrambled signal from PN descrambling element 704*a* and 704*b*. Note the even descrambled symbols are complex multiplied by the even pilot symbols.

In a second embodiment of pilot filters 710*a* and 710*b*, each pilot filter simply processes all of the samples.

The data from complex conjugate multipliers 712*a* and 712*b* are provided to Walsh sequence multipliers 714*a* and 714*b*. The Walsh traffic sequence is provided by Walsh generator 718 and the product sequence is provided from Walsh sequence multipliers 714*a* and 714*b* to combiner 724. Combiner 724 combines the Walsh sequence multiplied data as described with respect to combiner 224. The combined symbols are provided to accumulator 726 which accumulates the energy over the Walsh symbol length.

Figure 13:
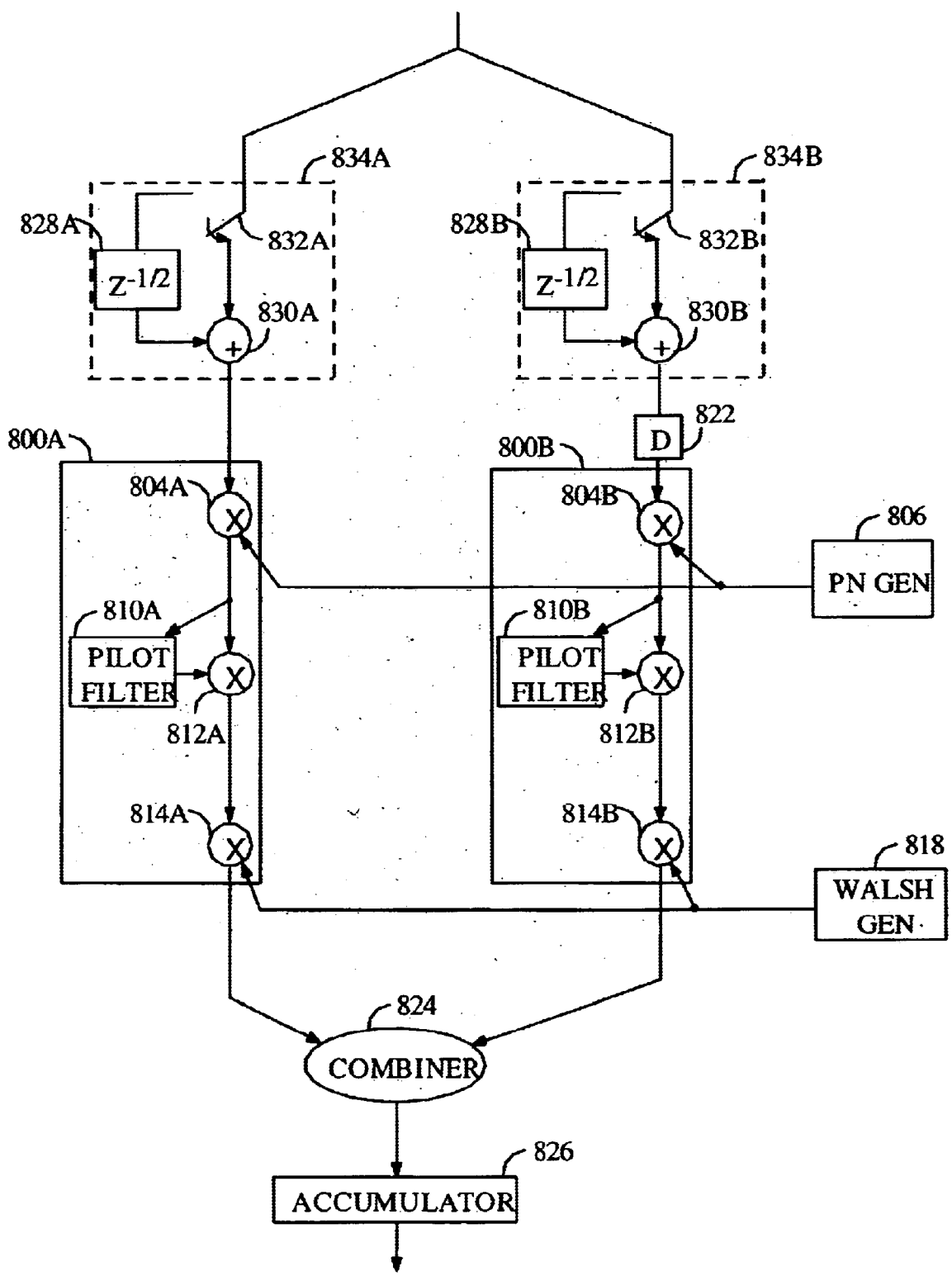
FIG. 13 illustrates an alternative embodiment that allows for the elimination of two demodulators and allows the reciver to operate at the PN chip rate

FIG. 13 illustrates a modification to FIG. 12. FIG. 13 essentially performs the operation as described with respect to FIG. 12 using the second implementation of the pilot filter. Demodulator 800*a* demodulates two paths that are one half PN chip apart and demodulator 800*b* demodulates two additional paths that are one half PN chip apart from one another and one full PN chip from the paths demodulated by demodulator 800*a*.

The samples are provided at twice the PN chip rate. The samples are provided to sample combiners 834*a* and 834*b*. Sample combiners 834*a* and 834*b* receive the samples at twice the PN chip rate and sum together sample received one half PN chip apart and provide the sum to demodulators 800*a* and 800*b* at the chip rate.

The first sample is provided to sample combiners 834 and is provided through switches 832 to delay elements 828. Delay elements 828 delay the sample by one half PN chip interval before providing the sample to a first summing input of summers 830. The second sample is then provided to equalizers 834 and provided through switches 832 to a second summing input of summer 830.

The two samples are summed together by summers 830 and the output is provided by sample combiner 834a to demodulator 800a and by sample combiners 834b to delay element 822. Delay element 822 delays the result from summer 830b by one PN chip interval before providing it to demodulator 800b.

In demodulators 800a and 800b, the received summed samples are provided to PN descrambling elements 804a and 804b. In the exemplary embodiment, PN descrambling elements 804a and 804b descramble the sample in accordance with two PN sequences ($PN_I$ and $PN_Q$) provided by PN generator 806. The complex descrambling operation is performed as described above with respect to complex despreading element 150a.

The complex PN descrambled sequences are provided to a first input of complex conjugate multipliers 812a and 812b and to pilot filters 810a and 810b. Complex conjugate multipliers remove phase ambiguities that are introduced by the propagation path. Complex conjugate multipliers 812a and 812b multiply the PN descramble symbols by the conjugate of the pilot filter symbols.

The data from complex conjugate multipliers 812a and 812b are provided to Walsh sequence multipliers 814a and 814b. The Walsh traffic sequence is provided by Walsh generator 818 and the product sequence is provided from Walsh sequence multipliers 814a and 814b to combiner 824. Combiner 824 combines the Walsh sequence multiplied data as described with respect to combiner 224. The combined symbols are provided to accumulator 826 which accumulates the energy over the Walsh symbol length. Although the present invention is described with respect to traditional PN sequences such as those in IS-95, the present invention is equally applicable to other spreading sequences such as Gold codes. Moreover, although coherent detection using pilot channel offer significant benefits in system performance, the present invention is equally applicable to non coherent detection methods that do not use a pilot channel.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A spread spectrum receiver for receiving multiple spread spectrum signals each traveling upon a different propagation path and each having a resultant arrival time difference with respect to one another, said spread spectrum receiver comprising:

first demodulator means for demodulating a first spread spectrum signal of said multiple spread spectrum signals in accordance with a first arrival time; and second demodulator means for demodulating a second spread spectrum signal of said multiple spread spectrum signals in accordance with a fixed time interval difference with respect to said first arrival time, wherein said first demodulator comprises:

first pseudonoise descrambling means for descrambling said first spread spectrum signal in accordance with a pseudonoise sequence to provide a first pseudonoise descrambled signal;

first phase adjustment means for filtering a first pilot signal from said first pseudonoise descrambled signal to provide a first filtered pilot signal and multiplying said first pseudonoise descrambled signal with said first filtered pilot signal to provide a first phase adjusted signal;

first dechannelization means for multiplying said first phase adjusted signal by an orthogonal channel sequence;

wherein said spread spectrum receiver further comprises pseudonoise generator for generating said pseudonoise sequence and wherein said second demodulator means comprises:

delay means for receiving said pseudonoise sequence and for delaying said pseudonoise sequence by said fixed time interval difference to provide a delayed pseudonoise sequence;

second pseudonoise descrambling means for descrambling said second spread spectrum signal in accordance with said delayed pseudonoise sequence to provide a second pseudonoise descrambled signal;

second phase adjustment means for filtering a second pilot signal to provide a second filtered pilot signal from said second pseudonoise descrambled signal and multiplying said second pseudonoise descrambled signal with said second filtered pilot signal to provide a second phase adjusted signal; and second dechannelization means for multiplying said second phase adjusted signal by a delayed orthogonal channel sequence.

2. The spread spectrum receiver of claim 1 wherein said second demodulator means comprises:

delay means for receiving said first spread spectrum signal and for delaying said first spread spectrum signal by said fixed time interval difference to provide said second spread spectrum signal;

second pseudonoise descrambling means for descrambling said second spread spectrum signal in accordance with said pseudonoise sequence to provide a second pseudonoise descrambled signal;

second phase adjustment means for filtering a second pilot signal from said second pseudonoise descrambled signal to provide a second filtered pilot signal and multiplying said second pseudonoise descrambled signal with said second filtered pilot signal to provide a second phase adjusted signal; and second dechannelization means for multiplying said second phase adjusted signal by a second orthogonal channel sequence.

3. The spread spectrum receiver of claim 1 further comprising a combiner means for receiving said first demodulated spread spectrum signal and said second demodulated spread spectrum signal and for combining said first demodulated spread spectrum signal and said second demodulated spread spectrum signal.

4. The spread spectrum receiver of claim 1 further comprising Walsh sequence generator means for generating said orthogonal channel sequence and wherein said spread spectrum receiver further comprises:

delay element for receiving said orthogonal channel sequence and for delaying said orthogonal channel sequence by said fixed time interval difference to provide said delayed orthogonal channel sequence.

5. The spread spectrum receiver of claim 1 further comprising switching means for providing said first spread spectrum signal to said first demodulator means and for switching after said fixed time interval difference to provide said second spread spectrum signal to said second demodulator means.

6. The spread spectrum receiver of claim 1 wherein said first phase adjustment means comprises:

complex conjugate multiplier means for receiving said first pseudonoise descrambled signal and said first filtered pilot signal and for multiplying said first pseudonoise descrambled signal with said first filtered pilot signal.

7. The spread spectrum receiver of claim 6 wherein a pilot filter extracts said first filtered pilot signal in accordance with an orthogonal pilot sequence.

8. A method for receiving multiple spread spectrum signals each traveling upon a different propagation path and each having a resultant arrival time difference with respect to one another, said method comprising:

demodulating a first spread spectrum signal of said multiple spread spectrum signals in accordance with a first arrival time;

demodulating a second spread spectrum signal of said multiple spread spectrum signals in accordance with a fixed time interval difference with respect to said first arrival time, wherein said demodulating said first spread spectrum signal comprises:

descrambling said first spread spectrum signal in accordance with a pseudonoise sequence to provide a first pseudonoise descrambled signal;

filtering a first pilot signal from said first pseudonoise descrambled signal to provide a first filtered pilot signal;

multiplying said first pseudonoise descrambled signal with said first filtered pilot signal to provide a first phase adjusted signal;

multiplying said first phase adjusted signal by an orthogonal channel sequence;

generating said pseudonoise sequence;

delaying said pseudonoise sequence by said fixed time interval difference to provide a delayed pseudonoise sequence;

descrambling said first spread spectrum signal in accordance with said delayed pseudonoise sequence to provide a second pseudonoise descrambled signal;

filtering a second pilot signal from said second pseudonoise descrambled signal to provide a second filtered pilot signal and multiplying said second pseudonoise descrambled signal with said second filtered pilot signal to provide a second phase adjusted signal; and multiplying said second phase adjusted signal by an orthogonal channel sequence.

9. The method of claim 8 wherein said demodulating said second spread spectrum signal comprises:

delaying said first spread spectrum signal by said fixed time interval difference to provide said second spread spectrum signal;

descrambling said second spread spectrum signal in accordance with said pseudonoise sequence to provide a second pseudonoise descrambled signal;

filtering a second pilot signal from said second pseudonoise descrambled signal to provide a second filtered pilot signal and multiplying said second pseudonoise descrambled signal with said second filtered pilot signal to provide a second phase adjusted signal; and multiplying said second phase adjusted signal by a second orthogonal channel sequence.

10. The method of claim 8 further comprising combining said first demodulated spread spectrum signal and said second demodulated spread spectrum signal.

11. A method for receiving multiple spread spectrum signals each traveling upon a different propagation path and each having a resultant arrival time difference with respect to one another, said method comprising:

demodulating a first spread spectrum signal of said multiple spread spectrum signals in accordance with a first arrival time; and demodulating a second spread spectrum signal of said multiple spread spectrum signals in accordance with a fixed time interval difference with respect to said first arrival time, wherein said demodulating said first spread spectrum signal comprises:

descrambling said first spread spectrum signal in accordance with a pseudonoise sequence to provide a first pseudonoise descrambled signal;

filtering a first pilot signal from said first pseudonoise descrambled signal to provide a first filtered pilot signal;

multiplying said first pseudonoise descrambled signal with said first filtered pilot signal to provide a first phase adjusted signal;

multiplying said first phase adjusted signal by an orthogonal channel sequence;

generating said orthogonal channel sequence; and delaying said orthogonal channel sequence by said fixed time interval difference.

12. The method of claim 11 further comprising:

first switching to provide said first spread spectrum signal; and second switching after said fixed time interval difference to provide said second spread spectrum signal.

* * * * *